US009117646B2

(12) United States Patent
Schwartz

(10) Patent No.: US 9,117,646 B2
(45) Date of Patent: Aug. 25, 2015

(54) METHOD AND APPARATUS FOR A COMBINED LINEAR ION TRAP AND QUADRUPOLE MASS FILTER

(71) Applicant: Thermo Finnigan LLC, San Jose, CA (US)

(72) Inventor: Jae C. Schwartz, Gilroy, CA (US)

(73) Assignee: Thermo Finnigan LLC, San Jose, CA (US)

( * ) Notice: Subject to any disclaimer, the term of this patent is extended or adjusted under 35 U.S.C. 154(b) by 0 days.

(21) Appl. No.: 14/045,979

(22) Filed: Oct. 4, 2013

(65) Prior Publication Data

US 2015/0097115 A1 Apr. 9, 2015

(51) Int. Cl.
*B01D 59/44* (2006.01)
*H01J 49/26* (2006.01)
*H01J 49/42* (2006.01)

(52) U.S. Cl.
CPC .......... *H01J 49/4215* (2013.01); *H01J 49/424* (2013.01)

(58) Field of Classification Search
USPC .......................... 250/281–283, 288, 290, 292
See application file for complete search history.

(56) References Cited

U.S. PATENT DOCUMENTS 2,939,952 A * 6/1960 Helmut Steinwedel et al. .......... 250/292
4,755,670 A * 7/1988 Syka et al. .......... 250/292
5,089,703 A * 2/1992 Schoen et al. .......... 250/292
RE34,000 E * 7/1992 Syka et al. .......... 250/292
5,282,451 A * 2/1994 Yoshida et al. .......... 123/406.15
5,324,939 A * 6/1994 Louris et al. .......... 250/292
5,420,425 A * 5/1995 Bier et al. .......... 250/292
5,468,958 A 11/1995 Franzen et al.
5,689,111 A * 11/1997 Dresch et al. .......... 250/287
5,783,824 A * 7/1998 Baba et al. .......... 250/281
6,011,259 A * 1/2000 Whitehouse et al. .......... 250/287
6,020,586 A * 2/2000 Dresch et al. .......... 250/287
6,087,658 A 7/2000 Kawato
6,157,030 A 12/2000 Sakairi et al.
6,177,668 B1 * 1/2001 Hager .......... 250/282
6,392,225 B1 * 5/2002 Schwartz et al. .......... 250/292
6,403,955 B1 * 6/2002 Senko .......... 250/292

(Continued)

FOREIGN PATENT DOCUMENTS

EP 1737019 A2 12/2006
WO WO 2010/028081 A2 3/2010

OTHER PUBLICATIONS

European Patent Office, Extended European Search Report mailed Dec. 18, 2014 for EP application # 14187094.

*Primary Examiner* — Bernard E Souw
(74) *Attorney, Agent, or Firm* — Thomas F. Cooney

(57) ABSTRACT

An apparatus for a mass spectrometer comprises: a set of four rod electrodes defining an ion occupation volume therebetween having entrance and exit ends, at least one of the rod electrodes having a slot passing therethrough; first and second ion optics disposed adjacent to the entrance and exit ends, respectively; a voltage supply system; and at least one supplemental electrode disposed at least partially within the at least one slot, wherein the voltage supply system is configured so as to supply a radio-frequency (RF) voltage, a direct-current (DC) filtering voltage and an oscillatory dipole resonant ejection voltage across members of the set of rod electrodes and so at to supply a secondary ion-trapping RF voltage and a secondary DC filtering voltage to the at least one supplemental electrode and to supply DC voltages across the rod electrodes and each of the first and second ion optics.

15 Claims, 18 Drawing Sheets

(56) References Cited

U.S. PATENT DOCUMENTS

| | | | | |
|---|---|---|---|---|
| 6,608,303 | B2 | 8/2003 | Amy et al. | |
| 6,844,547 | B2 * | 1/2005 | Syka | 250/292 |
| 7,279,681 | B2 | 10/2007 | Li et al. | |
| 7,285,773 | B2 * | 10/2007 | Ding et al. | 250/282 |
| 7,385,193 | B2 | 6/2008 | Senko | |
| 7,405,399 | B2 | 7/2008 | Wells | |
| 7,405,400 | B2 | 7/2008 | Wells | |
| 7,470,900 | B2 | 12/2008 | Wells | |
| 7,544,934 | B2 | 6/2009 | Senko | |
| 7,928,373 | B2 | 4/2011 | Quarmby et al. | |
| 7,947,948 | B2 * | 5/2011 | Schwartz | 250/283 |
| 8,304,720 | B2 * | 11/2012 | Senko et al. | 250/290 |
| 8,415,617 | B2 * | 4/2013 | Schwartz | 250/283 |
| 2003/0173524 | A1 * | 9/2003 | Syka | 250/396 R |
| 2004/0195504 | A1 | 10/2004 | Senko et al. | |
| 2008/0035842 | A1 * | 2/2008 | Sudakov et al. | 250/287 |
| 2010/0059670 | A1 * | 3/2010 | Schwartz | 250/281 |
| 2012/0248307 | A1 * | 10/2012 | Ding et al. | 250/293 |

* cited by examiner

METHOD AND APPARATUS FOR A COMBINED LINEAR ION TRAP AND QUADRUPOLE MASS FILTER

FIELD OF THE INVENTION

This invention relates generally to mass spectrometers, and more particularly to quadrupole ion optical components used in such mass spectrometers for separating ions according to mass-to-charge ratios.

BACKGROUND OF THE INVENTION

Quadrupole mass filters have been widely used for decades for routine mass spectrometric analysis of a variety of substances, including small molecules such as pharmaceutical agents and their metabolites, as well as large biomolecules such as peptides and proteins. More recently, two-dimensional radial-ejection ion traps (also known as "linear ion traps") have achieved widespread use (see, e.g., Schwartz et al., "A Two-Dimensional Quadrupole Ion Trap Mass Spectrometer", J. Am. Soc. Mass Spectrometry, 13: 659-669 (2002)). Generally described, such quadrupolar mass-analysis devices are grossly similar in structure and consist of four elongated electrodes, each electrode having a hyperbolic-shaped surface, arranged in two electrode pairs aligned with and opposed across the centerline midway between each electrode pair.

In both linear ion traps and quadrupole mass filters, there are four parallel rods, each spaced from a central axis, and typically shaped with hyperbolic or round rod profiles. Generally, the long dimension of the rods defines a Z-axis of a Cartesian coordinate system. Opposite phases of an RF voltage are applied between the rods separated in the X dimension, versus those separated in the Y dimension. This applied RF voltage affects the movement of ions in the X and Y dimensions, including the containment of the ions within the device. For linear ion trap operation, an axial containment field is added either through lens elements, or rod segments, to which an additional DC voltage can be applied to contain ions along the Z dimension.

In operation of quadrupole mass filter (QMF) devices, ions comprising a range of mass-to-charge (m/z) ratios are introduced into an entrance end of the apparatus along trajectories that are roughly parallel to the centerline. By properly choosing the magnitude of DC and RF voltages applied to the rods, the range of ions that pass completely through the apparatus can be restricted to only a desired narrow m/z range. The ions so transmitted may then be detected by a detector aligned so as to intercept ions that pass entirely through the apparatus, from one end to another. The detector generates a signal representative of the number of transmitted ions. The detector signals are conveyed to a data and control system for processing and generation of a mass spectrum.

In one form of linear ion trap device used for mass analysis, at least one of the electrodes of an electrode pair is adapted with an aperture (slot) extending through the thickness of the electrode or electrodes in order to permit ejected ions to travel through the aperture to an adjacently located detector. Ions are radially or transversely confined within the ion trap interior by applying opposite phases of a radio-frequency (RF) voltage to the electrode pairs, and may be axially or longitudinally confined by applying appropriate DC offsets to end sections or lenses located axially outward of the electrodes or central sections thereof. To perform an analytical scan, typically a dipole resonant excitation voltage is applied across the electrodes of the apertured electrode pair (often referred to as the X-electrodes because they are aligned with the X-axis of a Cartesian coordinate system, which is oriented such that X and Y are the radial axes of the trap and Z is the longitudinal axis extending along the trap centerline) while the amplitude of the RF voltage is ramped. This operation causes the trapped ions to come into resonance with the applied excitation voltage in order of their m/z ratios (m/z's). The resonantly excited ions develop unstable trajectories and are ejected from the trap through the aperture(s) of the X-electrodes to the detectors.

Each class of quadrupole mass analyzer—either quadrupole mass filters or linear ion traps—is associated with its own unique advantages. Ion traps are known for their high sensitivity for full-scan mass analysis, the ability to do iterated fragmentation and analysis ($MS^n$) experiments, and their high scan speed. Quadrupole mass filters are known for their ultimate sensitivity and limits of detection for targeted compound analysis and quantization. This disclosure relates to creating a single device that can act as both a linear ion trap and a quadrupole mass filter and thus can achieve the combination of performance characteristics, while saving the cost and complexity of having two separate devices within a mass spectrometer instrument. This creates a versatile device which has the ideal qualitative capabilities of ion traps while additionally maintaining the quantitative performance aspects of a QMF.

It is known that the slots necessary for linear ion trap operation cause a perturbation to the electric field and distort it away from the pure linear field. Various ways have been proposed to compensate for the deleterious performance effects of apertures put into the electrodes of ion trap apparatuses, including both three-dimensional (3D) ion traps (e.g., Paul traps) as well as linear ion traps. In some currently-available commercial linear ion trap systems, compensation for the effects of the slots is accomplished by stretching the electrode spacing outward from the theoretical optimum spacing for non-slotted hyperbolic rods. Essentially, this method of compensation introduces primarily positive octopolar and dodecapolar higher order (non-linear) fields, which compensates for the negative field distortions created by the slots. However, this method of compensation can not yield complete cancellation of the non-linear higher order fields. As a result, in the current implementation, often, some over compensation occurs, which still leaves some higher order fields for effective performance. Although the apparatus that is compensated in this fashion can operate well as an ion trap mass analyzer, it is desirable, for QMF operation, to be able to generate an RF field that is, essentially, as pure a quadrupole potential (linear field) as possible. Moreover, such compensation mechanisms are not readily adjustable. Preferably, any field distortion compensation mechanism should be adjustable in a fashion so as to be able to compensate for the effects of the ejection slot (so as to achieve optimum ion trap performance) while also being able to make the appropriate field corrections for operation in QMF mode, since these two modes of operation may have different field compensation requirements. The adjustment mechanisms could be employed both in real-time during instrument operation and also during instrument calibration so as to correct for distortions introduced by manufacturing mechanical defects.

U.S. Pat. No. 8,415,617 teaches one approach to achieving functionality as both an ion trap and a QMF by requiring the slots to be configured such that a four-fold symmetry is achieved, thereby resulting in a negligible octopole field component and a predominant dodecapole or icosapolar field distortion. Although this symmetrical configuration significantly reduces the level of field distortion, the residual non-linear fields caused by the slots can still have a deleterious effect on QMF performance. To allow the same structure to also operate as a more-ideal quadrupole mass filter (QMF) theoretically requires even further correction, requiring a more pure linear (quadrupolar) electric field, with near-complete cancellation of all non-linear fields.

The goal of providing the highest level of field correction, along with operationally-adjustable compensation leads to compensation methods which are more local to the slots, versus a global adjustment like stretching of the rod spacing as described above, or changing of the hyperbolic asymptote angles as is employed in some three-dimensional ion trap devices. One such approach that has been considered with regard to 3D ion traps is to put local protrusions, or bumps, adjacent to the slots. Such an approach has been described, for example, in United States pre-grant publication No. 2004/0195504 A1 and U.S. Pat. No. 6,087,658 in which local electrode bumps are used for field tailoring in order to optimize 3D ion trap performance. Although this approach shows some promise, it is limited in regard to the present objectives in that it does not readily allow adjustment of the field compensation when different compensations are needed for ion trap versus QMF mode. This approach is further limited in that it does not allow for general field-distortion correction, including correction of distortions introduced by manufacturing mechanical defects, for any given device.

U.S. Pat. No. 8,415,617 teaches using "shim" electrodes to achieve correction of field distortions due to the holes in the endcap electrodes of a 3D ion trap. This concept consists of using an additional electrode which is inserted into the aperture, to which a voltage can be applied. This voltage can compensate for the potential fall off caused by the existence of the hole in the endcap electrode, thereby flattening the equipotential contour to produce a more pure quadrupolar potential and associated linear field. The present inventor has realized that a similar concept may be extended to a linear ion trap, thereby allowing the same apparatus to also be used as a QMF.

SUMMARY OF THE INVENTION

In accordance with an illustrative embodiment, a two-dimensional quadrupole device is constructed from four parallel elongated rod electrodes arranged about and with their long dimensions parallel to a central axis. Each of the rod electrodes has an inwardly directed hyperbolic surface. At least one of the electrodes comprises a slot for ejection of ions therethrough to an associated detector, the slot being parallel to the axis and passing through a portion of the length of the electrode from the inwardly directed hyperbolic surface to an opposing outer surface, wherein at least one supplemental insert electrode is disposed at least partially within the slot along a portion of the length of the slot. In operation, a conventional quadrupole RF voltage is applied to the four rod electrodes, with the RF phase applied to each pair of diametrically opposed electrodes being exactly out of phase (i.e., by 180 degrees) with the other pair of diametrically opposed rod electrodes. A secondary RF voltage may be applied to this insert (or compensating) electrode such that it can be experimentally optimized to independent respective optimum values for operation of the device in either an ion trap mode or a quadrupole mass filter mode. The secondary RF voltage is in phase with but of a greater magnitude than the RF voltage of the rod electrode containing the slot within which it is disposed. Preferably, the secondary RF voltage can be adjusted during the course of instrument operation, either between separate analyses or during the course of an individual analysis, as is appropriate for the experiment being performed. The secondary RF voltage applied to the insert electrode or electrodes may also be adjusted and/or optimized so as to offset any deleterious effects of mechanical distortions on a per device basis which may exist in the structure due to manufacturing variations. In addition, the adjustability of the overall field may be optimized for other uses of the device, such as ion isolation, ion activation, ion injection, or ion ejection.

According to a first aspect of the present teachings, a combined quadrupole mass filter and linear ion trap apparatus for a mass spectrometer is provided, the apparatus comprising: a set of four substantially parallel rod electrodes defining an ion occupation volume therebetween having an entrance end and an exit end, at least one of the rod electrodes having a slot passing therethrough; first and second ion optics disposed adjacent to the entrance and exit ends, respectively; a voltage supply system; and at least one supplemental electrode disposed at least partially within the at least one slot, wherein the voltage supply system is configured so as to supply a transversely confining radio-frequency (RF) voltage, a direct-current (DC) filtering voltage and an oscillatory dipole resonant ejection voltage across members of the set of rod electrodes and so as to supply a secondary RF voltage and a secondary DC filtering voltage to the at least one supplemental electrode and to supply DC voltages across the rod electrodes and each of the first and second ion optics.

In various embodiments, all four rod electrodes may have slots therein wherein each slot has one or more supplemental electrodes disposed therein. In various embodiments, the slots and supplemental electrodes may be provided in only one of the rod electrodes or in only two rod electrodes that are diametrically opposed to one another with respect to the ion occupation volume. In various embodiments, the at least one supplemental electrode or one or more supplemental electrodes disposed within a slot or within each slot may comprise two spaced-apart supplemental electrodes, wherein each of the two supplemental electrodes is parallel to internal walls of the slot. Each of the two supplemental electrodes may be separated from a respective one of the slot internal walls by an electrically insulating spacer element. In various other embodiments, each supplemental electrode may comprise a respective single, integral supplemental electrode at least partially disposed within a slot and having an aperture passing therethrough. In various embodiments, the at least one supplemental electrode or the one or more supplemental electrodes disposed within a slot or each slot may be recessed within the slot with respect to an end of the slot that faces the ion occupation volume. In such cases, the rod electrode or each rod electrode may comprise a shield portion that partially blocks a direct line of sight between the respective one or more recessed supplemental electrodes and the ion occupation volume.

In accordance with a second aspect, there is provided a method of operating a quadrupole apparatus comprising: (a) four substantially parallel rod electrodes defining an ion occupation volume therebetween and having an entrance end and an exit end, wherein a rod electrode has a slot passing therethrough; (b) at least one supplemental electrode disposed within the slot; (c) a first detector disposed to receive ions that pass out of the ion occupation volume from the exit end; and (d) a second detector disposed to receive ions that pass out of the ion occupation volume through the slot, the method comprising: (i) applying an RF voltage to the rod electrodes such that the voltage waveform applied to a first pair of rod electrodes that are diametrically opposed to one another with respect to the ion occupation volume is 180-degrees out of phase with the voltage waveform applied to the other pair of rod electrodes; (ii) applying a secondary RF voltage to the at least one supplemental electrode such that the voltage waveform applied to each supplemental electrode is in-phase with and of a greater amplitude than the voltage waveform applied to the respective rod electrode having the slot within which said each supplemental electrode is disposed; (iii) supplying a sample of ions into the input end of the ion occupation volume while applying the RF voltage to the first pair of rod electrodes, the secondary RF voltage to the at least one supplemental electrode and a temporally varying DC voltage between the first and the other pairs of electrodes such that the mass to charge ratios of ions that pass through the ion occupation volume, through the exit end and to the first detector is controllably varied; and (iv) detecting the ions that arrive at the first detector so as to generate a mass spectrum of the sample of ions, wherein the greater amplitude of the secondary RF voltage applied to each supplemental electrode is chosen so as to optimize peak characteristics of the mass spectrum.

The method may further comprise: (v) supplying a second sample of ions into the input end of the ion occupation volume while applying the RF voltage to the rod electrodes and the secondary RF voltage to the at least one supplemental electrode; (vi) applying voltages to ion optical elements disposed adjacent to the entrance and exit ends and to the four rod electrodes so as to trap the second sample of ions within the ion occupation volume; (vii) applying a dipole AC excitation voltage between the rod electrode having the slot and the rod electrode that is diametrically opposed to the slotted rod electrode with respect to the ion occupation volume; (viii) temporally varying either the applied RF voltage amplitude and/or the AC excitation voltage amplitude while applying the secondary RF voltage having a different amplitude from that applied in step (ii) to the at least one supplemental electrode such that the mass to charge ratios of ions that are ejected through the slot and to the second detector is controllably varied; and (ix) detecting the ions that arrive at the second detector so as to generate a mass spectrum of the sample of ions.

BRIEF DESCRIPTION OF THE DRAWINGS

The above noted and various other aspects of the present invention will become apparent from the following description which is given by way of non-limiting example only and with reference to the accompanying drawings, not drawn to scale, in which.

DETAILED DESCRIPTION

The following description is presented to enable any person skilled in the art to make and use the invention, and is provided in the context of a particular application and its requirements. Various modifications to the described embodiments will be readily apparent to those skilled in the art and the generic principles herein may be applied to other embodiments. Thus, the present invention is not intended to be limited to the embodiments and examples shown but is to be accorded the widest possible scope in accordance with the features and principles shown and described. The particular features and advantages of the invention will become more apparent with reference to the appended FIGS. 1-12, taken in conjunction with the following description.

Figure 1:
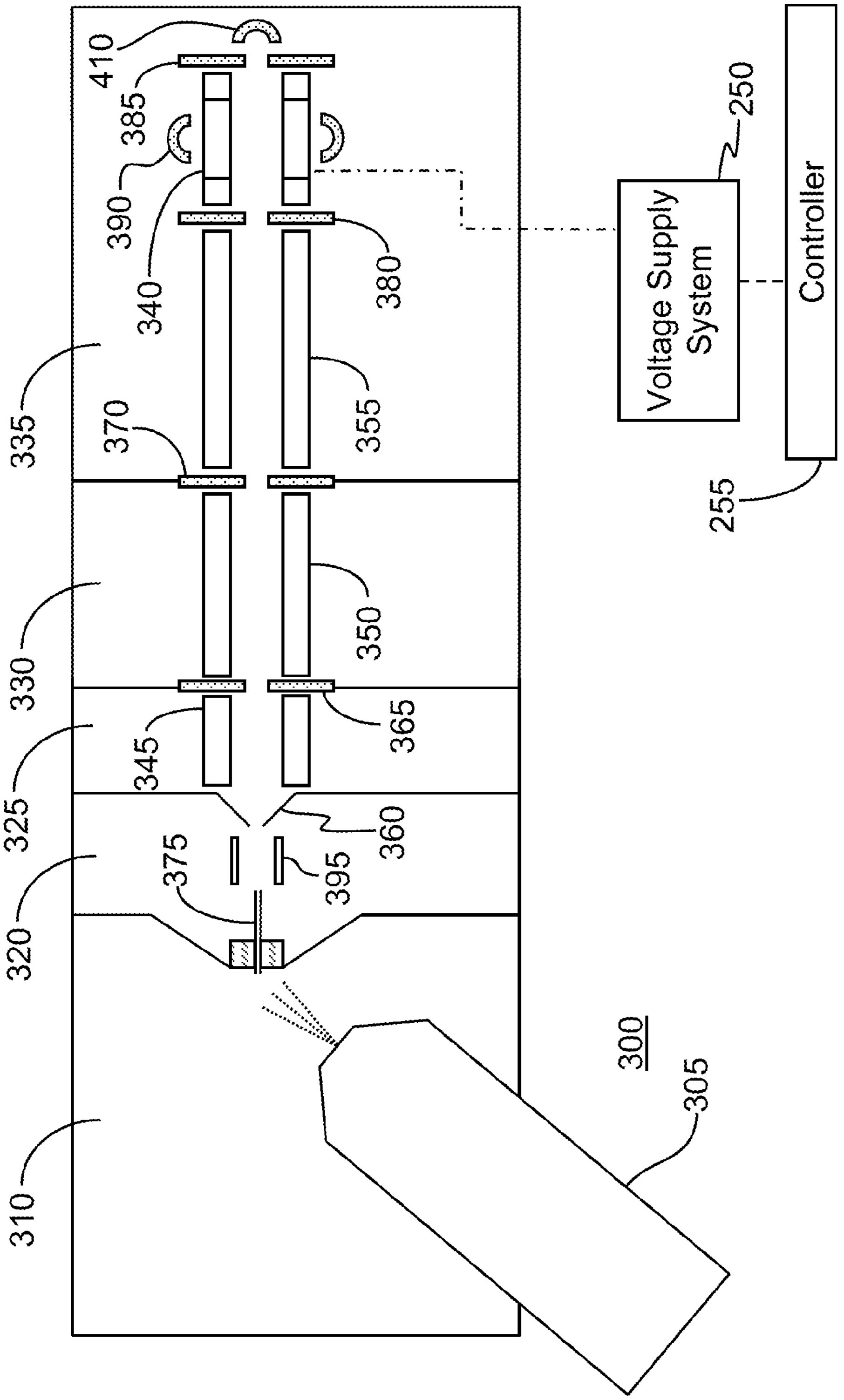
FIG. 1 (Prior Art)
FIG. 1 is a symbolic diagram of a mass spectrometer system utilizing a quadrupole device which may be utilized as either a quadrupole mass filter or a linear ion trap mass analyzer, in accordance with an embodiment of the present teachings.

FIG. 1 depicts the components of a mass spectrometer system 300 comprising a quadropole apparatus that is selectively operable as either a two-dimensional radial-ejection ion trap or a quadrupole mass filter, in accordance with an embodiment of the present teachings. Such a quadrupole apparatus is hereinafter referred to as a "dual-use quadrupole apparatus". It will be understood that certain features and configurations of the mass spectrometer system 300 are presented by way of illustrative examples, and should not be construed as limiting the implementation in or to a specific environment. An ion source, which may take the form of an electrospray ion source 305, generates ions from an analyte material, for example the eluate from a liquid chromatograph (not depicted). The ions are transported from ion source chamber 310, which for an electrospray source will typically be held at or near atmospheric pressure, through several intermediate chambers 320, 325 and 330 of successively lower pressure, to a vacuum chamber 335 in which dual-use quadrupole apparatus 340 resides. Efficient transport of ions from ion source 305 to dual-use quadrupole apparatus 340 is facilitated by a number of ion optic components, including quadrupole RF ion guides 345 and 350, octopole RF ion guide 355, skimmer 360, and electrostatic lenses 365 and 370. Ions may be transported between ion source chamber 310 and first intermediate chamber 320 through an ion transfer tube 375 that is heated to evaporate residual solvent and break up solvent-analyte clusters. Intermediate chambers 320, 325 and 330 and vacuum chamber 335 are evacuated by a suitable arrangement of pumps to maintain the pressures therein at the desired values. In one example, intermediate chamber 320 communicates with a port of a mechanical pump (not depicted), and intermediate pressure chambers 325 and 330 and vacuum chamber 335 communicate with corresponding ports of a multistage, multiport turbomolecular pump (also not depicted).

As will be discussed below in further detail, the dual-use quadrupole apparatus 340 is provided with axial trapping electrodes 380 and 385 (which may take the form of conventional plate lenses) positioned axially outward from the dual-use quadrupole apparatus electrodes to assist in the generation of a potential well for axial confinement of ions, and also to effect controlled gating of ions into the interior volume of dual-use quadrupole apparatus 340. The dual-use quadrupole apparatus 340 is additionally provided with at least one set of detectors 390 (which may comprise only a single detector) that generate(s) a signal representative of the abundance of ions that, in some operations, may be ejected radially from the dual-use quadrupole apparatus. A damping/collision gas inlet (not depicted), coupled to a source of an inert gas such as helium, may be provided to controllably add a damping/collision gas to the interior of dual-use quadrupole apparatus 340 in order to facilitate ion trapping, fragmentation and cooling.

Another detector 410 is disposed axially outward of the dual-use quadrupole apparatus 340. When it is desirable to operate the dual-use quadrupole apparatus 340 in QMF mode, a filtering DC component is added to the RF voltage applied to the electrodes of the dual-use quadrupole apparatus 340 by voltage supply system 250, in the manner known in the art and described above. Ions enter an inlet end of dual-use quadrupole apparatus 340 as a continuous or quasi-continuous beam. Ions in the selected range of m/z values (selection being achieved by choosing appropriate values of the magnitudes of the applied DC and RF voltages) maintain stable trajectories within the interior of the dual-use quadrupole apparatus 340 and leave the dual-use quadrupole apparatus 340 via an outlet end thereof, and are thereafter delivered to detector 410, which generates a signal representative of the abundance of transmitted ions. Ions having m/z values outside of the selected range develop unstable trajectories within the dual-use quadrupole apparatus 340 and hence do not arrive at detector 410. During operation in QMF mode, DC offsets applied to central electrodes of the dual-use quadrupole apparatus (as discussed in greater detail below) and to axial trapping electrodes 380 and 385 by DC voltage source 250 are set to enable the transport of the selected ions through the dual-use quadrupole apparatus 340 to detector 410.

When operation in ion trap mode is desirable, the filtering DC component can be removed for wide mass range trapping, and suitable DC offsets are applied to the end sections of the dual-use quadrupole apparatus and/or to axial trapping electrodes 380 and 385 to establish a potential well that enables trapping of ions within the interior volume of the dual-use quadrupole apparatus 340. The ions may then be subjected to one or more stages of isolation and fragmentation, if desired, and the ions or their products may be mass analyzed by resonantly ejecting the ions to detectors 390, in accordance with known techniques. In order to provide acceptable trapping efficiencies and to enable optional collision induced fragmentation during operation in the ion trap mode, a damping/collision gas may be added to the interior of the dual-use quadrupole apparatus 340 during its operation in ion trap mode. Although it is possible to choose a single gas pressure that is suitable for operation in either ion trap mode or QMF mode, it is also possible that a dual-trap configuration can be used. The dual-trap configuration would include a first quadropole trap device that is maintained at a higher pressure that is suitable for ion trapping, ion isolation, and ion fragmentation and would also include the dual-use quadrupole apparatus that is operated at a lower pressure that is optimal for both ion trap and QMF analyzing modes. Another alternative is when the dual-use quadrupole apparatus 340 is switched to QMF mode, the damping/collision gas may be pumped away such that the interior volume is maintained at a low pressure conducive to good filtering performance.

In one particularly favorable implementation, the dual-use quadrupole apparatus 340 may be automatically switched between ion trap and QMF modes in a data-dependent manner, whereby the acquisition of mass spectral data that satisfies specified criteria triggers mode switching. For example, the dual-use quadrupole apparatus 340 may initially be operated in QMF mode to provide single ion monitoring (SIM) of an ion species of interest. When the detector 410 generates a signal indicative of the presence of the ion species of interest, the dual-use quadrupole apparatus 340 may be automatically switched to operation in ion trap mode in order to perform MS/MS or $MS^n$ analysis for confirmation of the identification of the ion species of interest or to provide structural elucidation.

Figure 2:
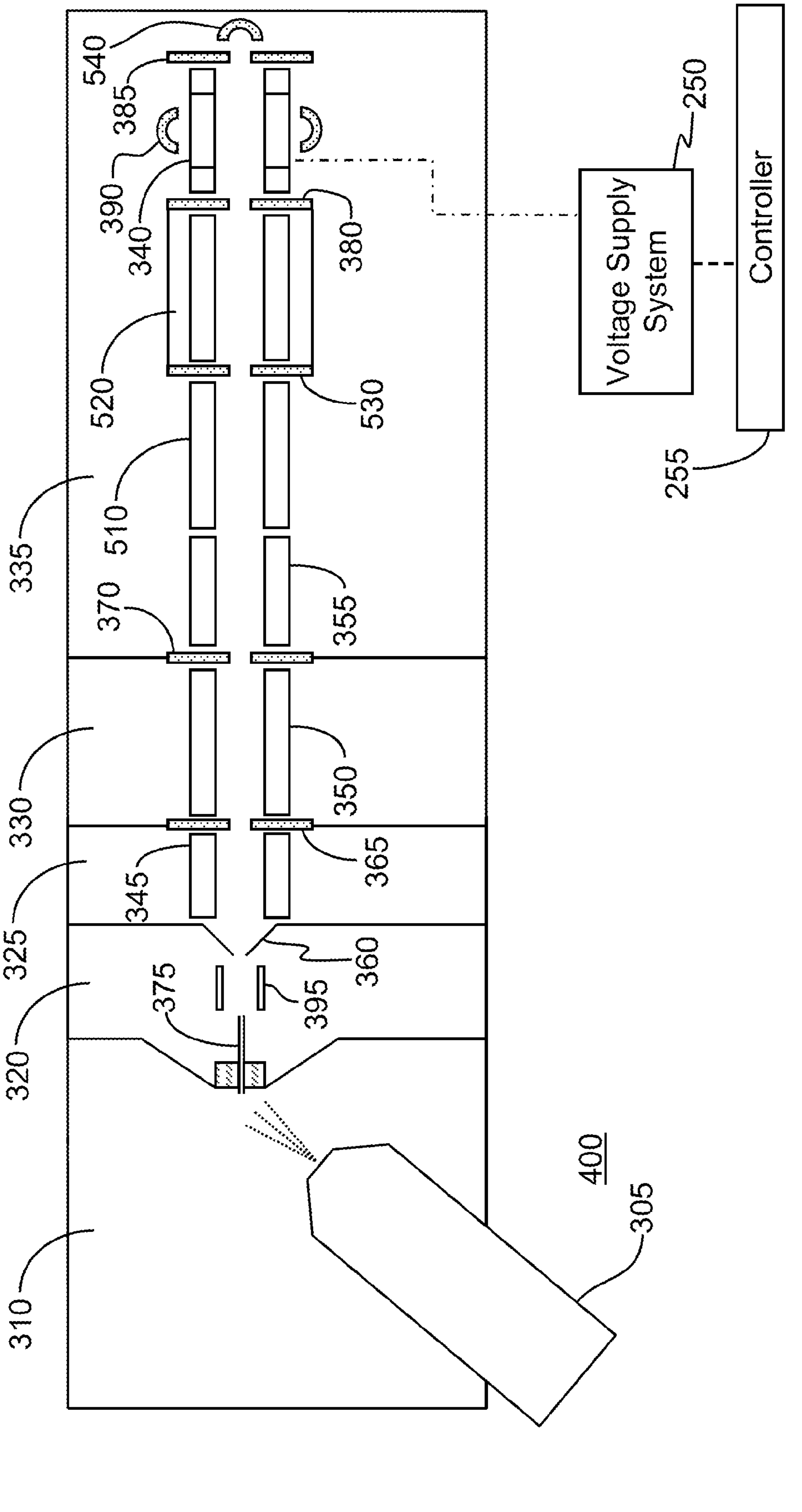
FIG. 2 (Prior Art)
FIG. 2 is a symbolic diagram of a second mass spectrometer system utilizing a quadrupole device which may be utilized as either a quadrupole mass filter or a linear ion trap mass analyzer, in accordance with another embodiment of the present teachings.

FIG. 2 depicts another mass spectrometer system 400, in which the dual-use quadrupole apparatus 340 is placed downstream of a quadrupole mass filter (QMF) 510 and a collision cell 520. The QMF 510 may take the form of a conventional multipole structure operable to selectively transmit ions within an m/z range determined by the applied RF and DC voltages. The collision cell 520 may also be constructed as a conventional multipole structure to which an RF voltage is applied to provide radial confinement. The interior of the collision cell 520 is pressurized with a suitable collision gas, and the kinetic energies of ions entering the collision cell 520 may be regulated by adjusting DC offset voltages applied to QMF 510, collision cell 520 and lens 530. As described above, the dual-use quadrupole apparatus 340 is selectably operable in an ion trap mode or a QMF mode and may be switched between the modes by adjusting or removing the RF, filtering DC, and DC offset voltages applied to central electrodes of the dual-use quadrupole apparatus (as discussed further below) and to axial trapping electrodes 380 and 385, and by adding or removing collision/damping gas to or from the interior volume.

When the dual-use quadrupole apparatus 340 is operated in QMF mode, mass spectrometer 400 functions as a conventional triple quadrupole mass spectrometer, wherein ions are selectively transmitted by QMF 510, fragmented in collision cell 520, and the resultant product ions are selectively transmitted by the dual-use quadrupole apparatus 340 to detector 540. Samples may be analyzed using standard techniques employed in triple quadrupole mass spectrometry, such as precursor ion scanning, product ion scanning, single- or multiple reaction monitoring, and neutral loss monitoring, by applying (either in a fixed or temporally scanned manner) appropriately tuned RF and DC voltages to QMF 510 and dual-use quadrupole apparatus 340.

Switching the dual-use quadrupole apparatus 340 to ion trap mode (which may be done in a data-dependent manner), as discussed above causes the mass spectrometer 400 to function as a QMF-ion trap instrument. In this mode of operation, ions are selectively transmitted through the QMF 510 and undergo collision induced dissociation in collision cell 520. The resultant product ions are delivered to the dual-use quadrupole apparatus 340 for trapping, manipulation and mass analysis. In one illustrative example, the product ions delivered to the dual-use quadrupole apparatus 340 may be subjected to one or more additional stages of fragmentation in order to provide confirmation of the identification of an ion species of interest. As described above, acquisition of a mass spectrum may be performed by resonantly ejecting the ions to detectors 390 in accordance with known techniques.

The operation of the various components of the mass spectrometer systems is directed by a control and data system 255, which will typically consist of a combination of general-purpose and specialized processors, application-specific circuitry, and software and firmware instructions. The control and data system also provides data acquisition and post-acquisition data processing services.

Although the mass spectrometer systems 300, 400 are depicted as being configured for an electrospray ion source, it should be noted that the dual-use quadrupole apparatus 340 may be employed in connection with any number of pulsed or continuous ion sources (or combinations thereof), including without limitation a matrix assisted laser desorption/ionization (MALDI) source, an atmospheric pressure chemical ionization (APCI) source, an atmospheric pressure photo-ionization (APPI) source, an electron ionization (EI) source, or a chemical ionization (CI) ion source. Furthermore, although FIGS. 1-2 depict an arrangement of ion transfer tube 375, tube lens 395 and electrostatic skimmer 360 for transporting and focusing ions from source chamber 305 to the vacuum regions of mass spectrometer systems 300, 400, alternative embodiments may employ for this purpose a stacked ring ion guide of the type described in U.S. patent application Ser. No. 12/125,013 in the names of inventors Senko et al. ("Ion Transport Device and Modes of Operation Thereof"), the entire contents of which are incorporated herein by reference.

Figure 3A:
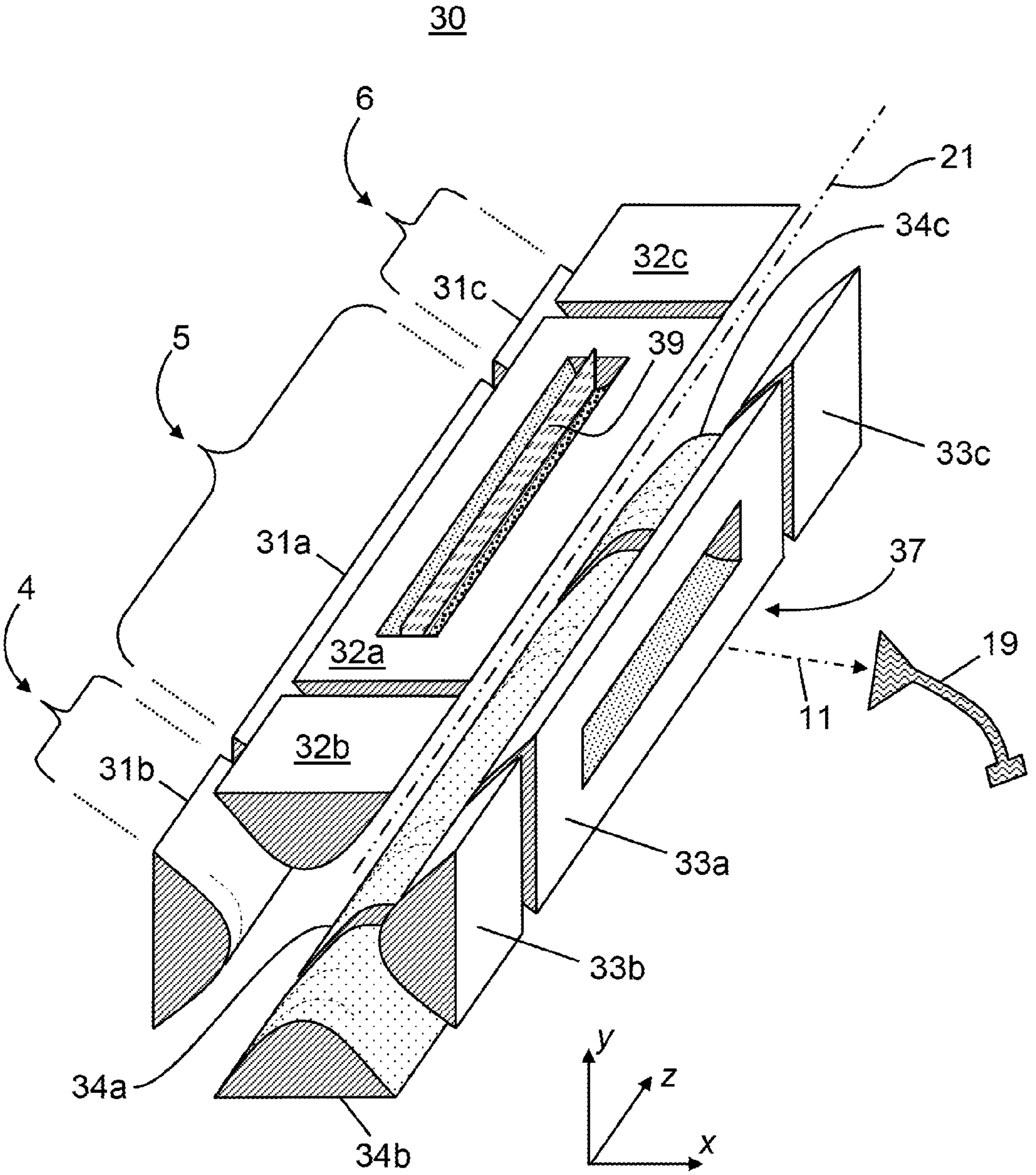
FIG. 3A is a perspective view of the rod electrodes of an ion quadrupole device in accordance with the present teachings and as employed in the mass spectrometer system of FIGS. 1-2.
Figure 3B:
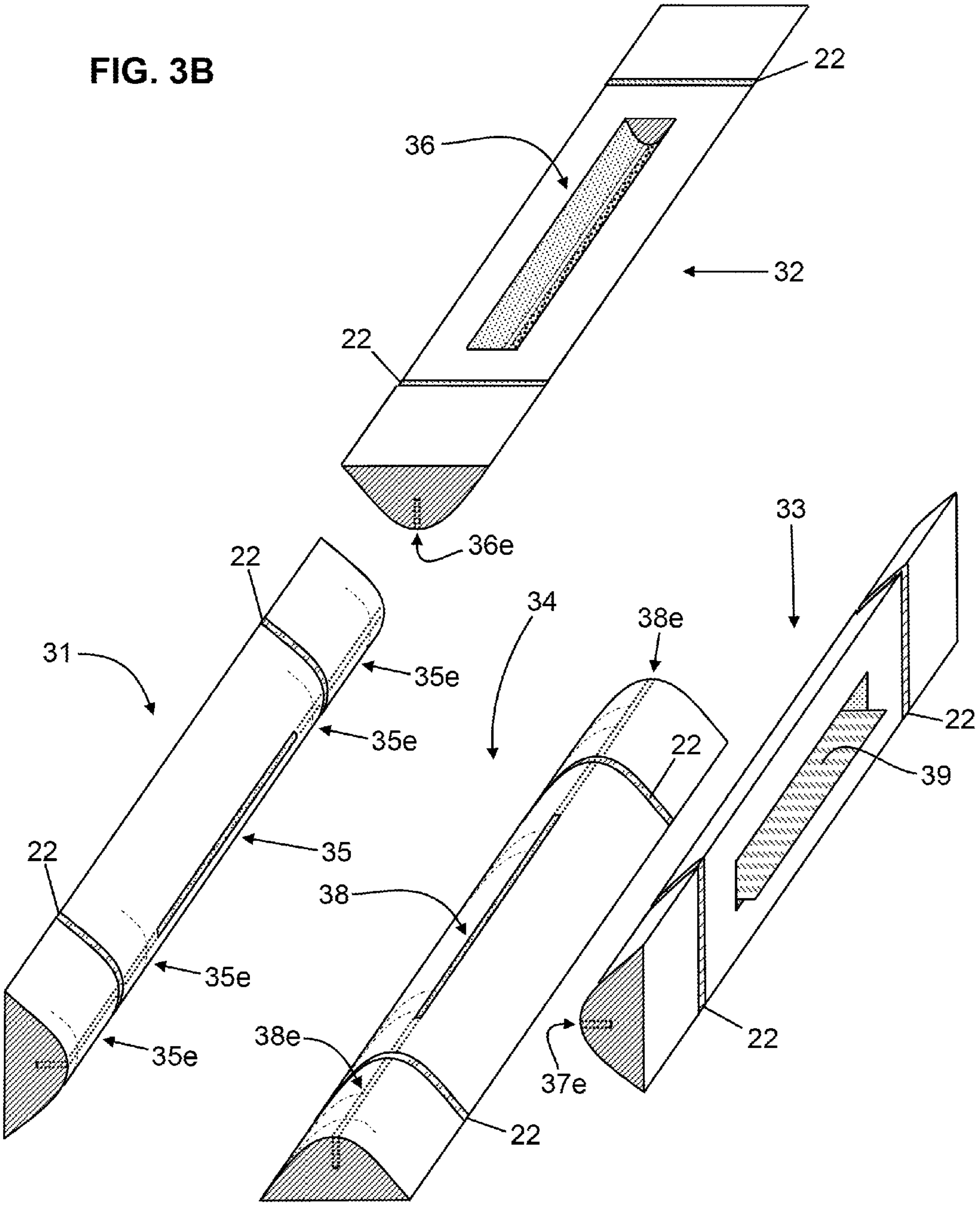
FIG. 3B is an exploded view of the rod electrodes of the ion quadrupole device as employed in the mass spectrometer system of FIGS. 1-2.
Figure 3C:
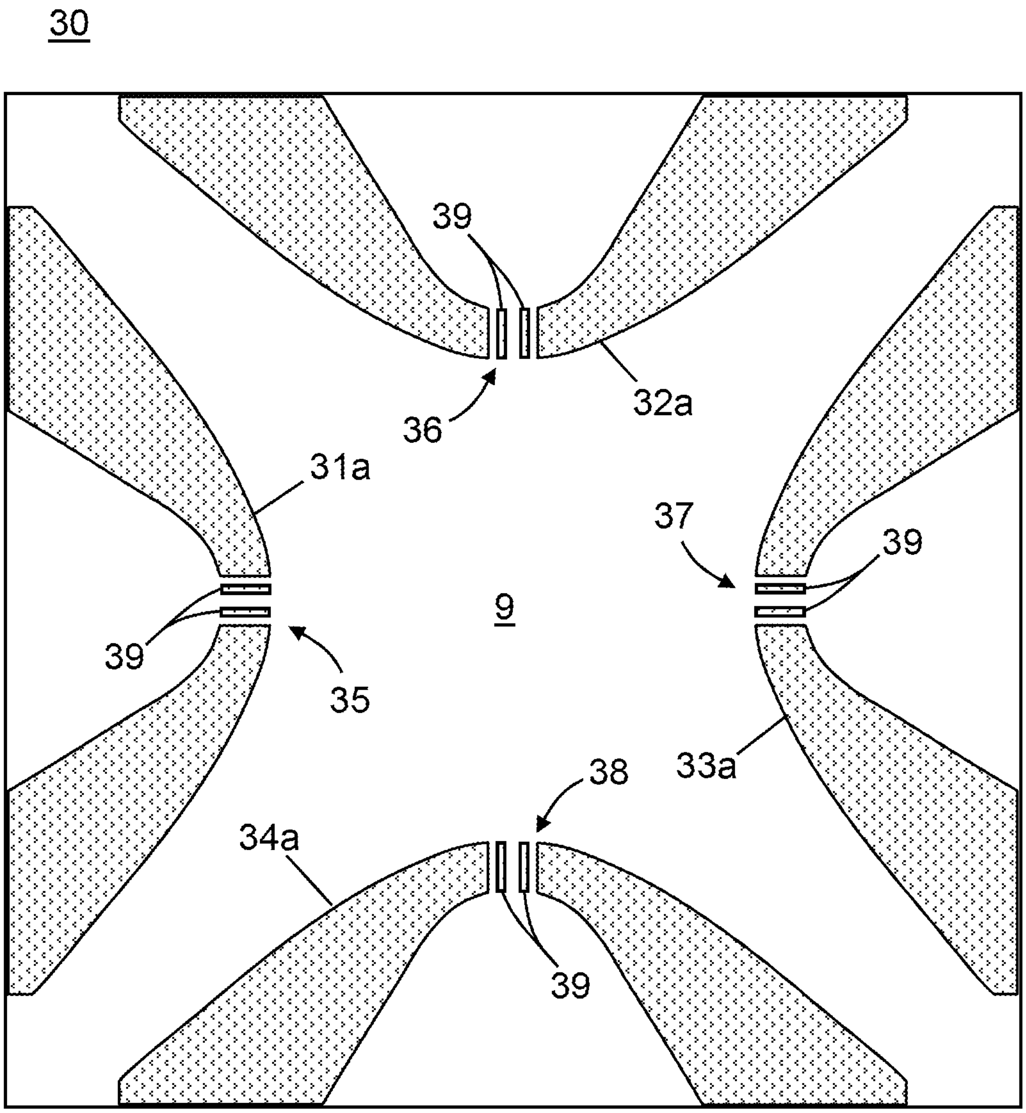
FIG. 3C is a transverse cross sectional view through the quadrupole rods and supplemental electrodes of one embodiment of a quadrupole apparatus in accordance with the present teachings.

FIG. 3A is a perspective view of a quadrupole apparatus 30 in accordance with the present teachings that is suitable for use as dual-use quadrupole apparatus as discussed above. FIG. 3B is an exploded view of the apparatus and FIG. 3C is a transverse cross-sectional view through the apparatus. The quadrupole apparatus 30 includes four elongated electrodes 31*a*, 32*a*, 33*a* and 34*a* arranged in mutually parallel relation about a centerline 21. Each electrode 31*a*, 32*a*, 33*a* and 34*a* has a truncated hyperbolic-shaped (or approximately hyperbolic-shaped) surface facing the interior volume of the quadrupole apparatus 30. In a preferred but optional implementation, the above-mentioned four electrodes comprise a center section 5 of the apparatus and the apparatus further comprises a front end section 4 comprising front-end electrodes 31*b*, 32*b*, 33*b* and 34*b* and a back end section 6 comprising back-end electrodes 31*c*, 32*c*, 33*c* and 34*c*.

Each elongated central electrode, taken together with its associated front-end and back-end electrodes disposed at its two ends as well as any inter-electrode insulators 22 may be considered to comprise an extended rod assembly. For such rod assemblies 31, 32, 33 and 34 are illustrated in FIG. 3B. For example, the rod assembly 31 (FIG. 3B) comprises front-end electrode 31*b*, central electrode 31*a* and back-end electrode 31*c* (FIG. 3A) as well as insulators 22. The other rod assemblies 32, 33 and 34 are defined similarly.

The individual electrodes of a rod assembly are electrically insulated from each other—for example, by means of insulators 22—to allow each of the front, center and back sections to be maintained at a different DC potential. Although the insulators 22 are shown, in FIG. 3B, in a configuration directly within the gaps between adjacent rod electrodes, other alternative configurations are possible in which the insulators are used to maintain the rods rigidly in position but are not disposed within the gaps. For example, the DC potentials applied to the electrodes 31*b*, 32*b*, 33*b* and 34*b* of front end section 4 and to the electrodes 31*c*, 32*c*, 33*c* and 34*c* of back end section 6 may be raised relative to the DC potential applied to central section electrodes 31*a*, 32*a*, 33*a* and 34*a* to create a potential well that axially confines positive ions to the central portion of the interior of the quadrupole apparatus 30. These DC potentials are herein referred to as "DC offset"

potentials. These front and back end sections can also be operated without any DC filtering (or DC offset) when operated in QMF mode. This mode of operation helps improve transmission in QMF mode by mimimizing fringe field effects as ions enter and leave the device in QMF mode. Thus, during QMF operation, the front end and back end sections may be operated in an "RF-only" configuration (of optimum amplitude) unlike the center section which requires the filtering DC voltage during QMF operation. The front end section 4 and back end section 6 may not be included in some implementations, which may not require as high a level of performance but require a simpler or more cost effective design. In these latter cases, the axial trapping electrodes 380 and 385 may be used to establish a potential well that confines ions along the direction of the longitudinal axis 21 for ion trap mode.

At least one of and as many as each of the central electrodes 31*a*, 32*a*, 33*a* and 34*a* is adapted with an elongated aperture (slot) 35, 36, 37, 38 that extends through the full thickness of the electrode to allow ions to be ejected therethrough in a transverse direction that is generally orthogonal to the central longitudinal axis 21 of the quadrupole apparatus 30 as, for example, along trajectory 11 leading to ion detector 19. Although only one detector—receiving ions ejected through slot 37 of central electrode 33*a*—is shown in FIG. 3A, an optional second detector could be present and positioned so as to receive ions ejected from slot 35 of the diametrically opposed central electrode 31*a*. Alternatively, the detector or detectors 19 might be located so as to receive ions ejected from one or both of slots 36 or 38.

The slots are typically shaped such that they have a minimum width at the inward-facing electrode surfaces (to reduce field distortions) and open outwardly in the direction of ion ejection. Optimization of the slot geometry and dimensions to minimize field distortion and ion losses is discussed by Schwartz et al. in U.S. Pat. No. 6,797,950 ("Two-Dimensional Quadrupole Ion Trap Operated as a Mass Spectrometer"), the disclosure of which is incorporated herein by reference. In FIG. 3B, the slots 35-38 are shown as extending along only a portion of the lengths of the central rod electrodes. However, in alternative embodiments, each slot or an associated depression, groove or furrow may extend along the entire length of each central rod electrode and similar slots, depressions or furrows could likewise occur in the front-end and back-end electrodes. Such depressions, grooves or furrows need not extend completely through the electrodes from the internal ion occupation volume to the device exterior. For example, as shown in FIG. 3B, grooves 35*e*, 36*e*, 37*e* and 38*e* extend only partly into the rod electrodes of respective rod assemblies 31, 32, 33 and 34. grooves 35*e*, 36*e*, 37*e* and 38*e* extend longitudinally along the interior hyperbolic (or near hyperbolic surfaces and in-line with respective slots 35, 36, 37 and 38. The depressions, grooves or furrows provided in such a fashion serve as non-fully-penetrating extensions of the slots and help to minimize any abrupt changes in certain internal electric field components that might otherwise occur at slot edges.

At least one of and, preferably, each of the slots 35-38 has one or more supplemental electrodes (insert electrodes) that are at least partially contained within the slot. FIG. 3A schematically illustrates an insert electrode 39 disposed within the slot 36 of central electrode 32*a* (note that this slot is not labeled in FIG. 3A but is labeled in FIG. 3B); FIG. 3B schematically illustrates another insert electrode 39 disposed within slot 37 of central electrode 33*a* (note that this latter slot and central electrode are not labeled in FIG. 3B but are labeled in FIG. 3A). For clarity of presentation, these insert electrodes are depicted as being generally enlarged relative to their actual size. Generally, using the resonance ejection technique, ions will be ejected from either one or two slots (i.e., a pair of diametrically opposed slots). Nonetheless, to maintain optimal symmetry that gives rise to pure or nearly-pure quadrupolar fields, it is preferable—although not essential—to maintain identical slots in at least two slots in diametrically opposed central rod electrodes and, most preferably, in all four of the central rod electrodes and to maintain identical insert electrodes in all of the slots.

Central electrodes 31*a*, 32*a*, 33*a* and 34*a* (or a portion thereof) are coupled (see FIGS. 1-2) to the voltage supply system 250 for receiving a transversely confining RF voltage, a resonance excitation voltage, a filtering DC voltage (for operating in QMF mode) and a DC offset voltage (for containing ions in the direction parallel to the central longitudinal axis 21). The voltage supply system may communicate with and operate under the control of controller 255, which forms part of the control and data system. The RF voltage of adjustable amplitude is applied in a prescribed phase relationship to pairs of electrodes 31*a*, 32*a*, 33*a* and 34*a* to generate a field that radially or transversely confines ions within the interior of ion trap 340. The RF voltage may also be applied to the electrodes 31*b*, 32*b*, 33*b* and 34*b* of the front end section 4, if present, and to the electrodes 31*c*, 32*c*, 33*c* and 34*c* of the back end section 6, if present.

The voltage supply system 250 further applies secondary RF voltages to the supplemental insert electrodes 39, where the RF phase applied to any such insert electrode is identical to the RF phase of the central rod electrode having the slot in which the respective insert electrode is disposed and the RF amplitude is greater, by a certain percentage, then the RF amplitude applied to the central rod electrode. The voltage supply system 250 may also be configured to apply an oscillatory dipole excitation voltage of adjustable amplitude and frequency across at least one pair of opposed rod electrodes to create a dipolar excitation field that resonantly excites ions for the purposes of isolation of selected species, collision induced dissociation, and mass-sequential analytical scanning when the apparatus is employed as a linear ion trap. The dipole excitation voltage is applied to the electrodes of the center section 5 as well as to the electrodes of the front end section 4, if present, and the back end section 6, if present. The voltage supply system 250 may also be employed to apply the oscillatory dipole excitation voltage to the insert electrodes 39, where the excitation voltage phase applied to any such insert electrode is identical to the excitation voltage phase of the central electrode having the slot in which the respective insert is disposed. The application of the oscillatory dipole excitation voltages to the insert electrodes 39, although desirable, is not required. In addition, there is a possible additional use of the dipole excitation voltage in QMF mode to assist in mass filtering as is described in U.S. Pat. No. 5,089,703 in the names of inventors Schoen et. al.

The voltage supply system 250 or comprises components that may be configured to, during operation as a linear ion trap mass analyzer, apply DC offset potential differences between the central electrode section 5 and entrance-end ion optics (or ion optical elements) and exit-end ion optics (or ion optical elements). The entrance-end ion optics include the front-end electrode section 4 if this section is present. The exit-end ion optics include the back-end electrode section 6, if present. The entrance-end ion and exit-end ion optics may also include axial trapping electrodes 380 and 385. These DC potential differences may be applied so as to, for example, generate a potential well that axially confines ions within the quadrupole apparatus 30. In an alternative configuration, axial confinement is achieved by applying RF voltage waveforms on the electrode end sections 4, 6 and/or on the trapping electrodes 380 and 385 that are exactly out of phase with the RF waveforms applied to the central electrodes so as to generate an axial pseudo-potential well. This alternative configuration provides the capability of simultaneous axial confinement of ions of opposite polarities, which is useful for certain ion trap functions, such as electron transfer dissociation (ETD) in which positive analyte ions are reacted with negative reagent ions to yield product ions.

The voltage supply system 250 also provides a DC filtering voltage that is utilized during operation of the quadrupole apparatus 30 as a quadrupole mass filter (QMF) so as to superimpose a DC voltage on the RF voltages applied to the central rod electrodes in known fashion so as to controllably vary the mass-to-charge ratio of ions that are transmitted through the apparatus 30. The voltage supply system 250 may also apply the same DC voltages to the insert electrodes 39, where the magnitude of the DC filtering voltage applied to any insert electrode is greater than the magnitude of the DC voltage applied to the respective enclosing central rod electrode. Preferably, the DC filtering voltage applied to any insert electrode is greater than the DC filtering voltage applied to the enclosing rod electrode by the same percentage by which the secondary RF voltage amplitude applied to the respective insert electrode exceeds the RF voltage applied to the enclosing rod electrode. Generally, the DC filtering voltage is not applied the electrodes of the front-end and back-end sections 4, 6 during QMF operation.

Accordingly, each supplemental insert electrode 39 is electrically coupled to the voltage supply system 250. The voltage supply system 250 is operable such that the sinusoidal voltage profile applied to each insert electrode is, regardless of whether the apparatus 30 is used as a quadrupole mass filter or a linear ion trap, exactly in phase with but of a greater amplitude than the voltage profile applied to the electrode having the slot in which the respective insert electrode is disposed. The greater RF amplitude, or RF overvoltage, applied to the insert electrodes serves to maintain a close approach to a purely quadrupolar field within the quadrupole apparatus 30. The greater-magnitude of the DC filtering voltage applied to the insert electrodes provides the same benefit during QMF operation. The optimum RF overvoltages utilized for either linear-ion-trap resonant-excitation operation or quadrupole-mass-filter excitation are preferably determined by calibration and may be different for these two different modes of operation.

During a mass-sequential analytical scan in which the quadrupole apparatus 30 is utilized as a linear ion trap mass analyzer, the excitation and RF trapping voltage amplitudes applied to the central electrodes 31*a*, 32*a*, 33*a* and 34*a* and supplemental insert electrodes 39 may be temporally varied in accordance with calibrated relationships experimentally determined by known techniques. The amplitudes of the excitation and trapping RF voltages applied to the insert electrodes 39 are greater (generally, by a certain percentage) than the RF amplitudes applied to the central electrodes, wherein the specific amount or percentage may be determined by calibration.

During operation of the quadrupole apparatus 30 as a quadrupole mass filter mass analyzer, in which the m/z values of transmitted ions is caused to progressively vary (in other words, scanned), RF voltages are applied to the central electrodes 31*a*, 32*a*, 33*a* and 34*a* and insert electrodes 39 with RF amplitude that is applied to the insert electrodes being greater, by a calibrated amount or percentage, than the RF amplitude that is applied to the central electrodes. During scanning, a time-varying DC filtering voltage may be applied to both the central rod electrodes and insert electrodes so as to controllably vary the m/z values of ions transmitted through the apparatus 30. During such operation, similar RF voltages (but generally not DC filtering voltages) may be applied to the front-end electrodes 31*b*, 32*b*, 33*b* and 34*b* and back-end electrodes 31*c*, 32*c*, 33*c* and 34*c* as are applied to the central electrodes 31*a*, 32*a*, 33*a* and 34*a*.

Many different insert electrode geometries may be envisaged. The specific geometry employed may affect its field correction aspects. In order to understand how the different insert electrode geometries may affect the operation of a dual-use quadrupole apparatus such as the apparatus 30, equipotential surfaces of and ion trajectories through the quadrupole apparatus 30 were simulated using SIMION® charged-particle optics simulation software commercially available from Scientific Instrument Services of 1027 Old York Rd. Ringoes N.J. 08551-1054 USA. Several geometries have been considered including those shown in FIG. 3C and FIGS. 5-7 and discussed in greater detail following.

FIG. 3C illustrates a transverse cross-sectional view through the central electrodes of the apparatus 30 showing one possible configuration of the supplemental or insert electrodes 39 within the electrode slots 35-38. An ion occupation volume 9 may be identified between the parallel rod electrodes 31*a*, 32*a*, 33*a* and 34*a* and about the central longitudinal axis or centerline 21. The ion occupation may be defined as a region of space between the rod electrodes within which, during operation of a quadropole apparatus, at least some ions are at least partially confined for some period of time. For example, the ion occupation volume may be regarded as a simple ion transit volume if RF voltages are applied, in known fashion, to the rod electrode electrodes and if ions are introduced into the ion occupation volume from a first end (an entrance end) and allowed to pass through the apparatus in a direction parallel to the central axis 21 from the first end to a second end (an exit end). In this case, the applied RF voltage serves as a transversely confining RF voltage since ions are prevented from exiting the ion occupation volume 9 other than through one of the front or back ends (generally the back end) of the quadrupole rod set. Thus, in this situation, the quadropole apparatus performs as an ion transmission device wherein ions are partially confined transversely—that is, along the x and y axes—but not along the z axis (see FIG. 3A). The transmission from the first (or entrance or front) end to the second (or exit or back) end may be caused or aided by a DC axial field between the first and second ends. If a filtering DC voltage is also applied to the rod electrodes, then only a portion of the ions will transit the full length of the apparatus from the first end to the second end, in accordance with the ions' mass-to-charge ratio. In this instance, the ion occupation volume 9 may be regarded as a filtering volume. If at least some of the ions are confined along x and y axes are caused, after introduction into the apparatus, to be also confined along the z axis (e.g., by operation of ion lenses or gates) such that the ions cannot pass out of the apparatus at either the entrance or the exit end, then the ion occupation volume may be regarded as a trapping volume.

In the configuration shown in FIG. 3C, a pair of supplemental insert electrodes 39 are disposed within each slot 35, 36, 37, 38. The electrodes 39 of each pair of insert electrodes are electrically coupled to one another. Thus, each electrode of a pair of electrodes within a slot carries the same voltage. Further, the electrode pairs of diametrically opposed slots are electrically coupled to one another. That is, the pair of insert electrodes 39 disposed within slot 35 of central electrode 31*a* are electrically coupled to the pair of insert electrodes disposed within slot 37 of the diametrically opposed central electrode 33*a*. A similar statement may be made with regard to pairs of insert electrodes disposed within slot 36 and slot 38.

Figure 3D:
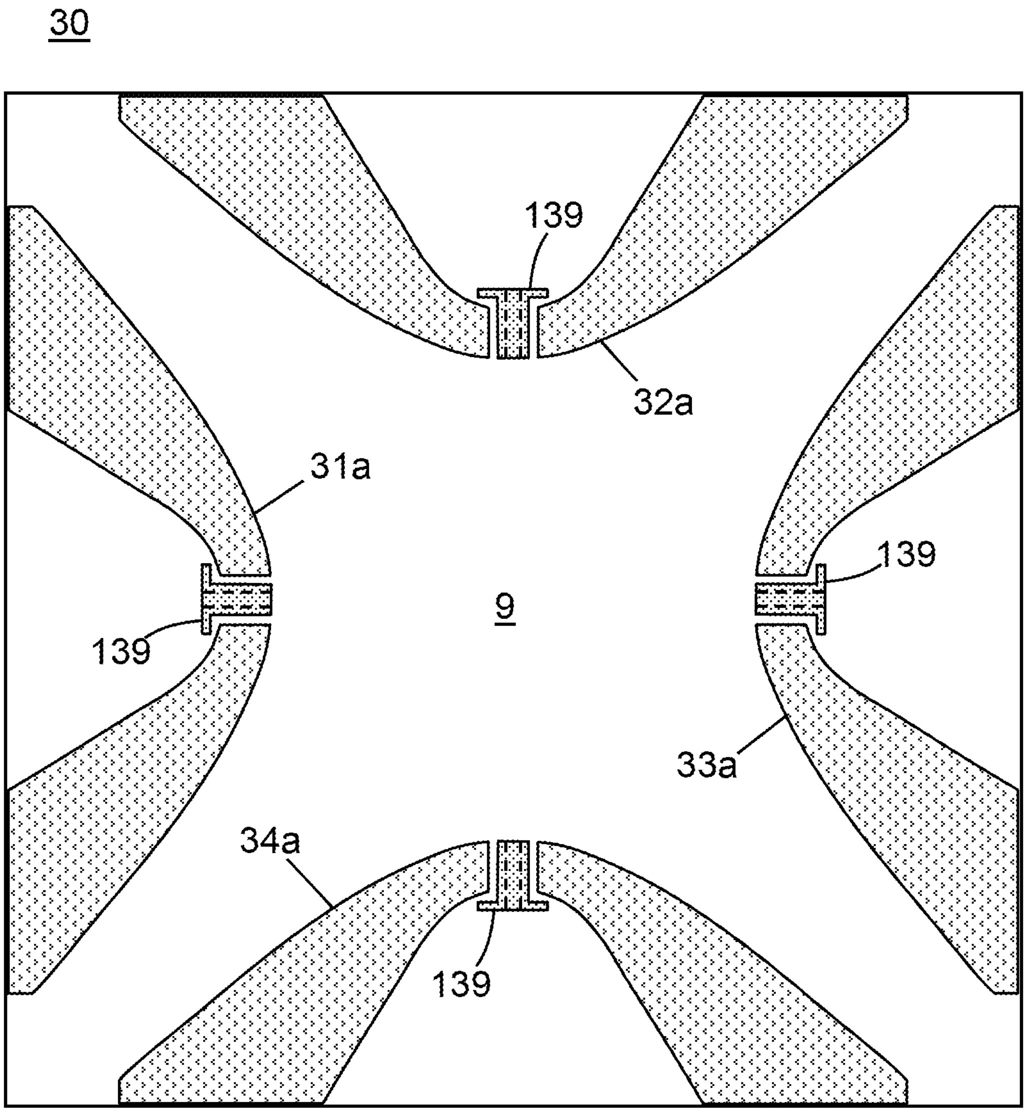
FIG. 3D is a transverse cross sectional view through the quadrupole rods and supplemental electrodes of another embodiment of a quadrupole apparatus in accordance with the present teachings.
Figure 3F:
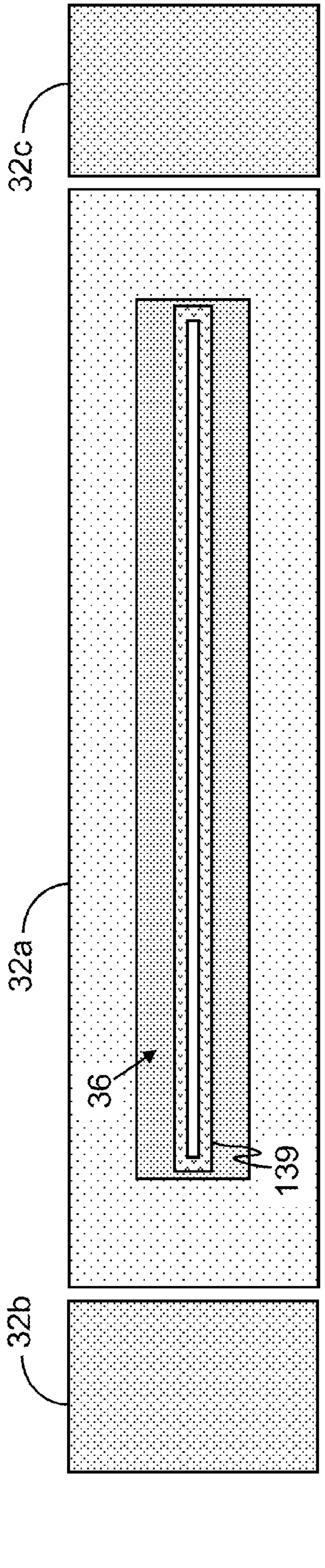
FIG. 3F is a longitudinal view of the quadrupole rod and supplemental electrode of FIG. 3D.
Figure 4:
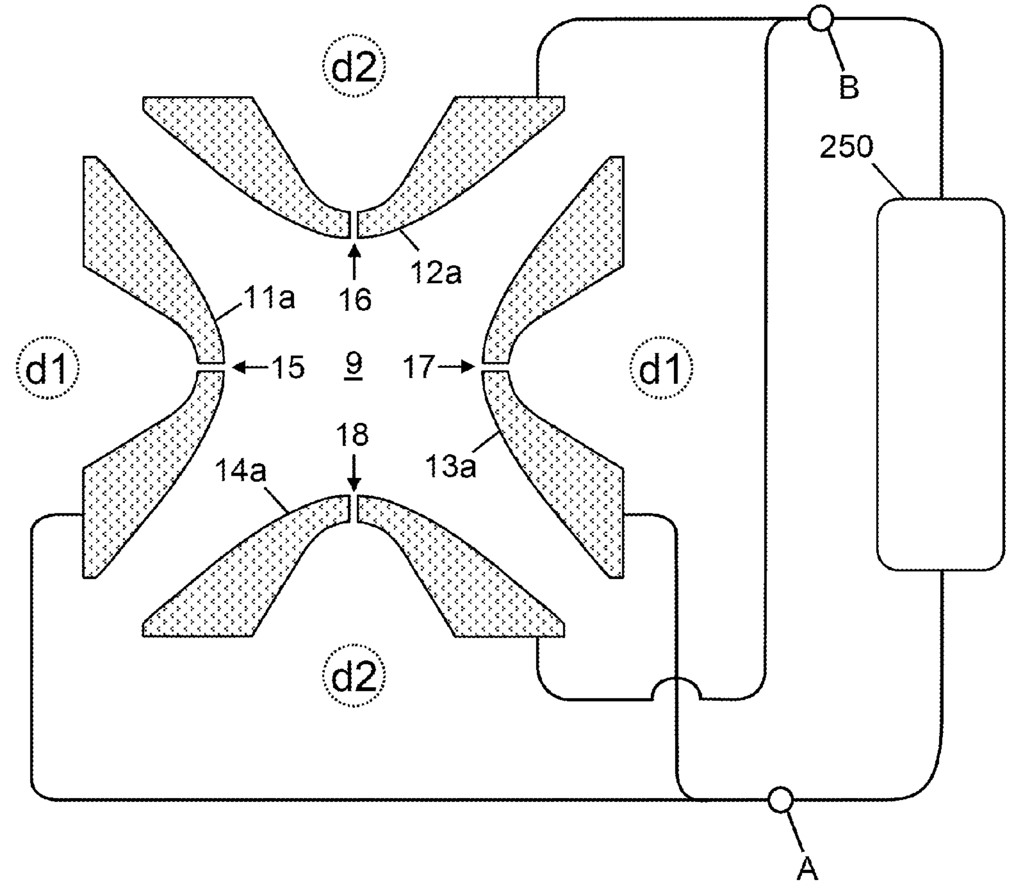
FIG. 4 (Prior Art)
FIG. 4 is a transverse cross sectional view through the quadrupole rods of a known linear ion trap mass analyzer apparatus and further showing electrical connections to the rods.

The electrode configuration shown in FIG. 3C (as well as the alternative configuration illustrated in FIG. 3D and FIG. 3F) may be compared with a conventional configuration of slotted electrodes 11*a*, 12*a*, 13*a* and 14*a* of a linear ion trap device as shown in FIG. 4. The widths of the slots 35, 36, 37, 38 of the novel configuration shown in FIG. 3C are enlarged relative to the widths of the conventional slots 15, 16, 17, 18 shown in FIG. 4 such that the separation between individual insert electrodes 39 of each associated pair of such electrodes is roughly equal to the conventional slot width. FIG. 4 also illustrates typical basic electrical connections. An RF oscillating potential difference is applied between points A and B, which are electrically connected to electrodes 11*a* and 13*a* and electrodes 12*a* and 14*a*, respectively. Thus, two electrode pairs are defined, with the electrodes of each pair being diametrically opposed with respect to the ion occupation volume 9. The phase of the RF voltage applied to one of the pairs of electrodes is always exactly out of phase with the phase applied to the other pair of electrodes. To perform mass scanning by resonance ejection of ions, an additional dipole AC voltage (an excitation voltage) is applied across either electrodes 11*a* and 13*a* if ions are to be ejected through one or both of slots 15 and 17 to detectors at one or both of positions d1 or across electrodes 12*a* and 14*a* if ions are to be ejected through one or both of slots 16 and 18 to detectors at one or both of positions d2.

As previously described, embodiments of apparatuses in accordance with the present teachings supplement the electrode configuration shown in FIG. 4 with one or more supplemental insert electrodes at least partially disposed within one or more of the slots of central rod electrodes. As will be shown in detail below, application of a secondary RF voltage across the insert electrodes in which the amplitude is greater by a certain percentage, δ, than the RF amplitude applied to the main rod electrodes enables operation in QMF mode. During QMF operation, a DC potential difference (filtering DC) may also be supplied between points A and B (FIG. 4) which are electrically coupled to the rod electrodes. Generally, during QMF operation of apparatuses in accordance with the present teachings, the varying filtering DC potential difference applied between the insert electrode set within slots 35 and 37 (e.g., FIG. 3C) and the insert electrode set within slots 36 and 38 will be greater by the same above-noted percentage, δ, than the filtering DC potential difference between the set of central rod electrodes 31*a* and 33*a* and the set of central rod electrodes 32*a* and 34*a*. Proper selection of the RF and DC potentials in the QMF mode of operation enables controlled selection of the ionic mass-to-charge ratios that may propagate through the full length of the ion occupation volume 9.

Figure 3E:
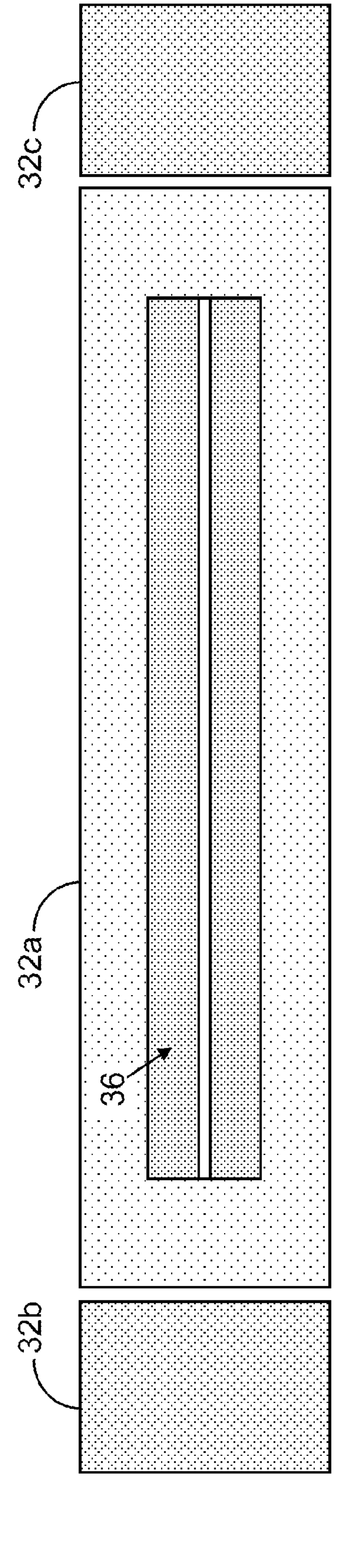
FIG. 3E (Prior Art)
FIG. 3E is a longitudinal view of a conventional quadrupole rod used in a linear trap mass analyzer.

FIG. 3C illustrates an embodiment in which the supplemental insert electrodes 39 disposed within each slot comprise a pair of parallel plates that are electrically coupled to one another. FIG. 3D and FIG. 3F illustrate an alternative configuration in which the parallel plates within each slot comprise separate portions of a single, integral supplemental insert electrode member 139, where the gap between the two parallel plates is, in fact, an aperture or slot through the single, integral supplemental insert member 139. FIG. 3D illustrates cross sectional views through the four insert electrode members 139—one such insert member disposed within each of slots. FIG. 3F illustrates a schematic longitudinal view of a single such supplemental insert electrode member 139 as would be viewed looking directly downward towards the rod assembly 32 illustrated in FIG. 3A and FIG. 3B. As illustrated in FIG. 3F, the insert electrode member 139 extends along most or all of the length of the slot 36 in the central rod electrode 32*a*. The remaining three insert electrode members 139 are disposed similarly within the slots of the central rod electrodes 31*a*, 33*a* and 34*a*. In the example shown in FIG. 3F, the slot 36 and the insert electrode member 139 are shown as occupying only a central portion of the length of the rod electrode 32*a*. However, in alternative embodiments, the slot or an associated depression or furrow may extend along the entire length of the central rod electrode 32*a* and similar slots, depressions or furrows could likewise occur in the front-end and back-end electrodes 32*a*, 32*c* (for example, as illustrated in FIG. 3B as grooves 35*e*, 36*e*, 37*e* and 38*e*. For comparison, FIG. 3E shows a similar view of a conventional rod electrode (without an insert electrode).

Figure 5:
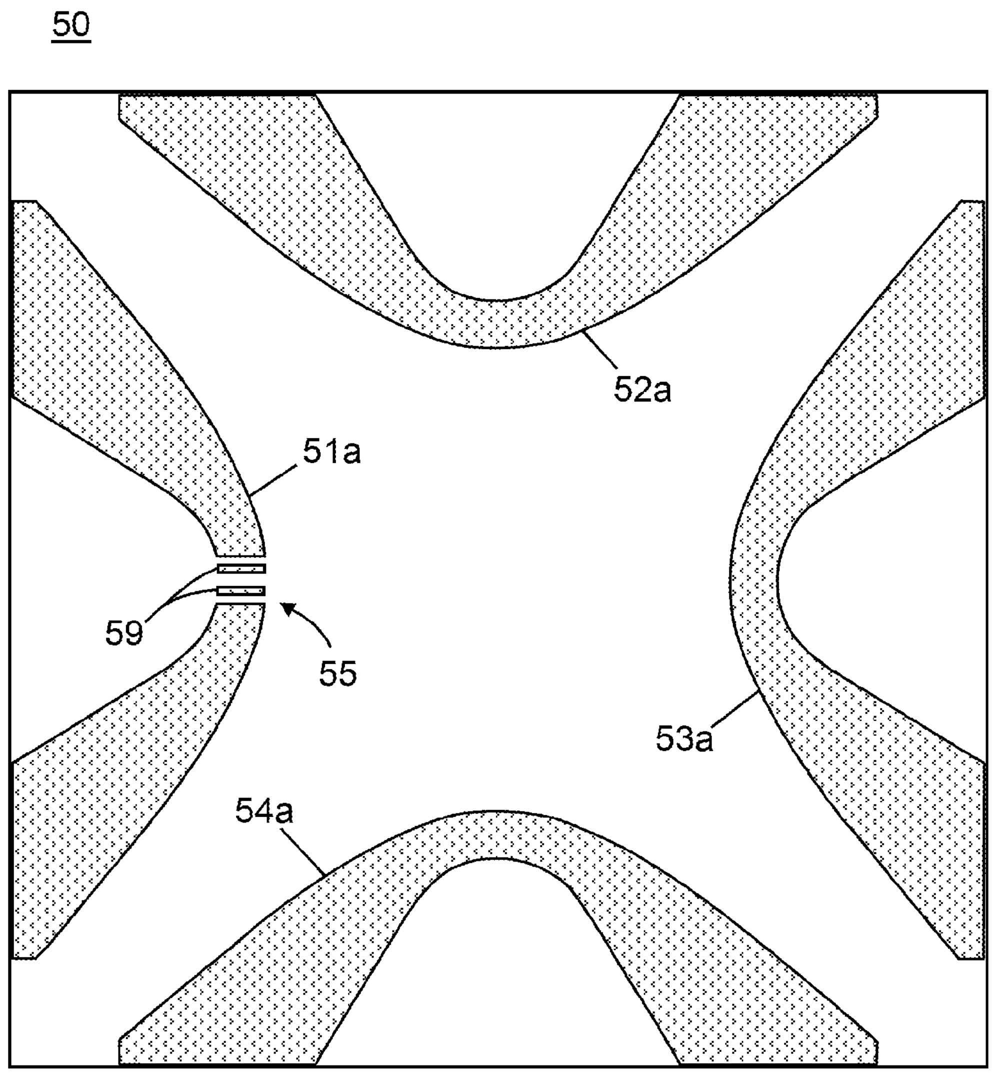
FIG. 5 is a transverse cross sectional view through the quadrupole rods and supplemental electrode or electrodes of another embodiment of a quadrupole apparatus in accordance with the present teachings.

For best operation of the apparatus 30, it is preferable for the rod electrodes and insert electrode members (or separate insert electrode plates) to be fabricated and assembled so as to maintain fourfold symmetry of the electrode assembly about the central axis. Thus, it is preferable for all four central rods to comprise nearly identical slots and for all slots to comprise nearly identical insert electrode assemblies. Nonetheless, there may be some situations in which adequate performance may be achieved with a configuration that employs fewer than four slotted electrodes. Such an alternative configuration is shown in FIG. 5 as assembly 50 in which, of the four central electrodes 51*a*, 52*a*, 53*a* and 54*a*, only the electrode 51*a* has a slot (slot 55) and a set of supplemental insert electrodes 59 (or a single integral supplemental insert electrode member as described above). This alternative configuration shown in FIG. 5 may be fabricated with less machining cost than is required for the situation (e.g., FIG. 3C) in which four slotted electrodes and their associated inserts are employed. In operation of an apparatus having the assembly 50, the compensating secondary voltage may applied to the single set of insert electrodes 59 can minimize the departure of internal fields from purely quadropole symmetry, despite the lack of fully fourfold physical symmetry. Various other alternative embodiments have slots and supplemental insert electrodes in only two diametrically opposed central rod electrodes.

Figure 6A:
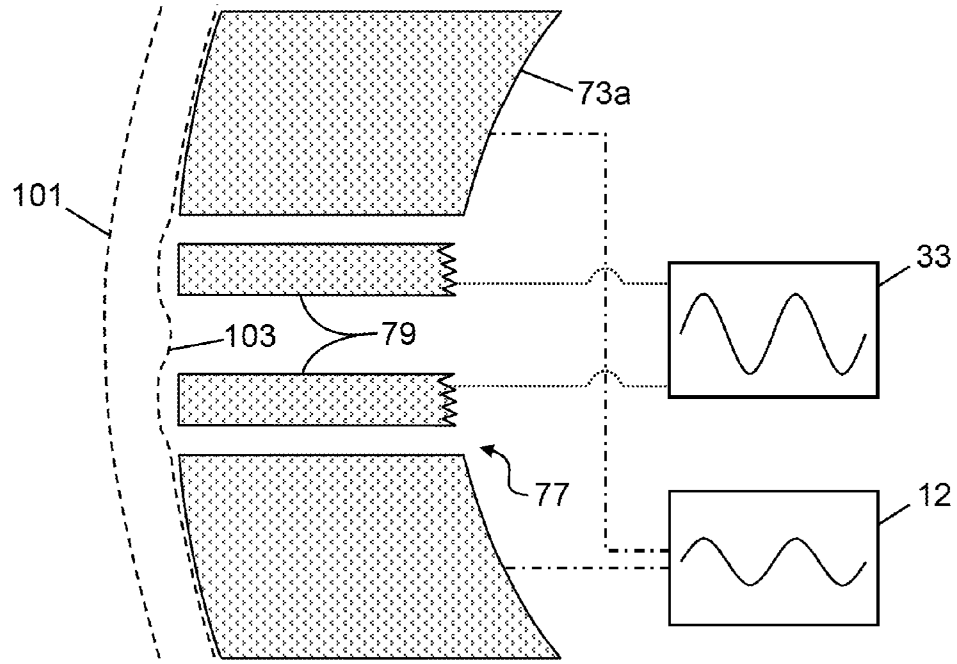
FIG. 6A is view through the slotted portion of a rod and one or more supplemental electrodes in accordance with the present teachings showing RF power sources and their electrical connections to the electrodes.
Figure 7C:
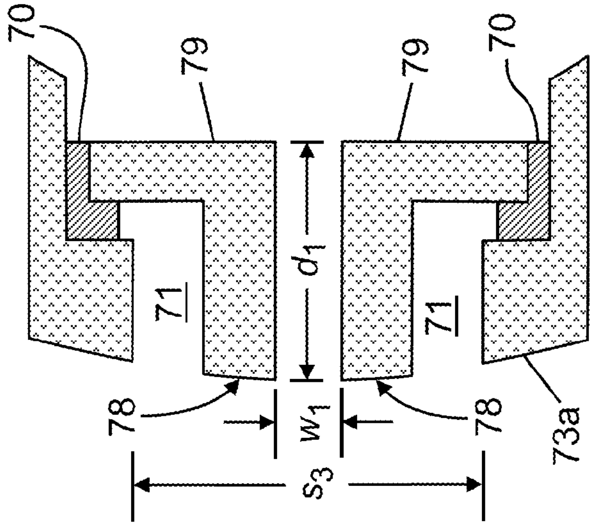
FIG. 7C is an expanded transverse cross sectional view through the slotted portion of an individual quadropole rod and one or more supplemental electrodes in accordance with various other embodiments of quadrupole apparatuses in accordance with the present teachings.

As noted above, computer simulations were performed in order to determine acceptable and optimal slot parameters. FIG. 6A shows selected equipotential contour lines as calculated for an apparatus in accordance with the present teachings (specifically, for an apparatus having an electrode configuration as shown in FIG. 7C) under the application of RF voltages to both the rod electrode 73*a* and the insert electrodes 79. As indicated in FIG. 6A, RF voltage sources 12 and 33 provide RF voltage waveforms of identical frequencies and phase to both the rod and insert electrodes with the waveform provided by RF voltage source 33 having a greater amplitude. The application of the RF overvoltage to the insert electrodes substantially reduces the encroachment of equipotential contour lines into or towards the slot 77, as would be observed without the insert electrodes, especially for equipotential contours, such as contour 101, that are not in immediate proximity to the slot. However, equipotential lines very close to the slot, such as contour 103, may still exhibit some local perturbations relative to pure quadrupolar contours (which would smoothly parallel the inner surface of the rod electrode 73*a* in the absence of the slot 77).

An apparatus using the configuration illustrated in FIG. 6A will exhibit QMF operation that is substantially identical to that of a dedicated quadrupole mass filter device (a set of four un-slotted rods), since confinement of ions of interest occurs in a restricted region close to centerline 21 (FIG. 3A). However, the apparatus may exhibit somewhat degraded performance when used as a resonance-ejection mass analyzer because the undulations in equipotential contours near to the slot (e.g., contour 103) may cause a portion of ions to be deflected away from the slot 77.

Figure 6B:
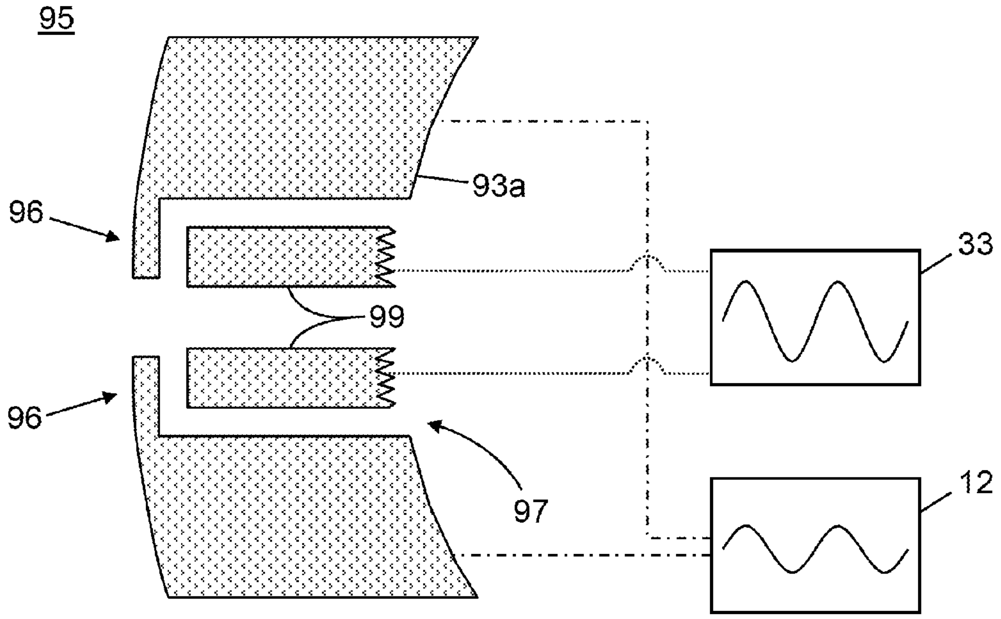
FIG. 6B is a cross-sectional depiction of the slotted portion of an individual rod and one or more supplemental electrodes of yet another embodiments of quadropole apparatuses in accordance with the present teachings, also showing RF power sources and their electrical connections to the electrodes.
Figure 6C:
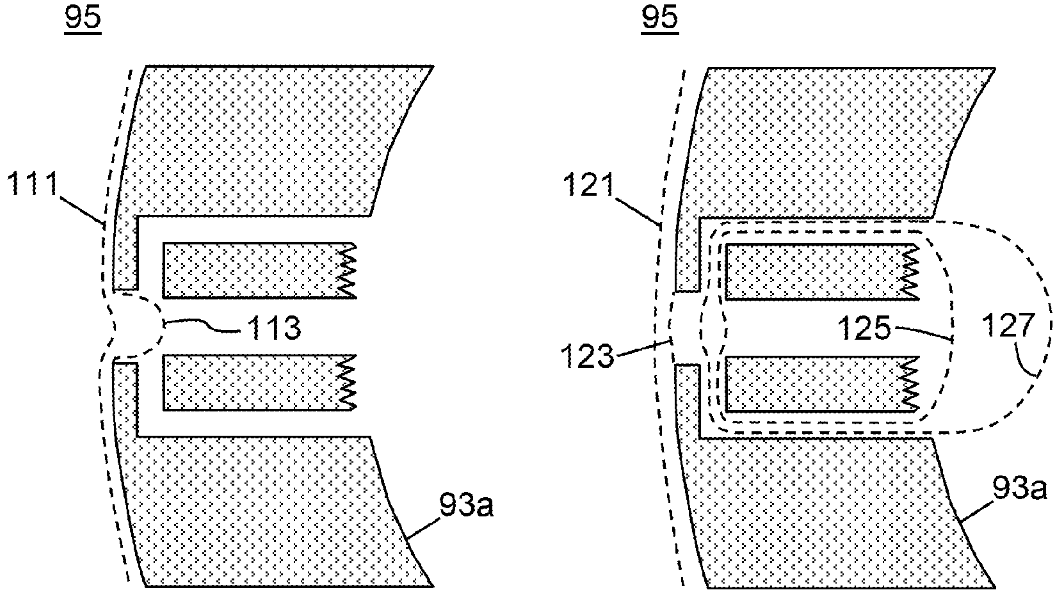
FIG. 6C is a pair of cross-sectional depictions of the rod and supplemental electrode(s) of FIG. 6B, also showing calculated traces of equipotential surfaces, the leftmost depiction applicable to the situation in which the insert electrode(s) is/are at the same RF voltage as the rod and the rightmost depiction applicable to a situation in which the supplemental insert electrode(s) is/are maintained with a 20% RF overvoltage.
Figure 6D:
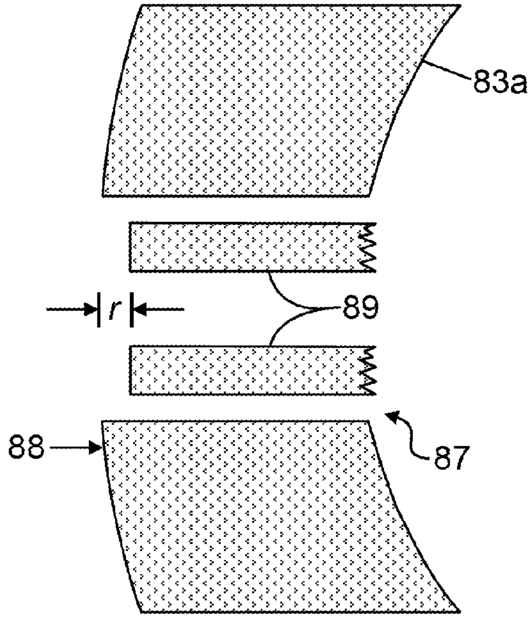
FIG. 6D is an expanded transverse cross sectional view through the slotted portion of an individual quadropole rod and one or more supplemental electrodes of yet other various embodiments of quadropole apparatuses in accordance with the present teachings.

The undulations in the contour 103 (FIG. 6A) may be further minimized by positioning the insert electrodes (e.g., insert electrodes 99 in FIG. 6B or insert electrodes 89 in FIG. 6D) in a recessed position within the rod electrode slot (e.g., slot 97 in rod electrode 93*a* in FIG. 6B or slot 87 in rod electrode 83*a* in FIG. 6D) with respect to the rod internal surface (e.g., surface 88 shown in FIG. 6D). The recessed insert electrodes may be partially shielded from the field within the interior of the quadrupole apparatus by means of extensions of the inward-facing surface of the associated rod electrode so as to partially block a portion of the slot in which the recessed electrodes are disposed. An example of this configuration is illustrated in FIG. 6B, in which extensions 96 of the rod electrode 93*a* extend partially over or into the slot 97 in which the insert electrodes 99 are disposed, the extensions 96 at least partially blocking lines of sight between the insert electrodes and the ion occupation volume 9. By contrast, FIG. 6D shows an embodiment having a recessed insert electrode but no shield extensions of the enclosing rod electrode. FIG. 6C illustrates equipotential contours calculated for the shielded electrode configuration of FIG. 6B. Equipotential countours 111 and 113 are calculated for a situation in which an over-voltage is not applied to the insert electrodes 99; equipotential contours 121, 123, 125 and 127 are calculated in accordance with a twenty percent overvoltage applied to the insert electrodes and show very good compensation of the dip in the equipotential contours.

Figure 7B:
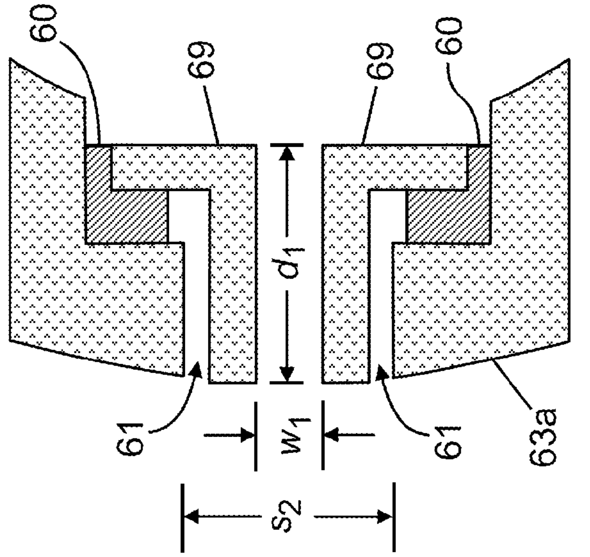
FIG. 7B is an expanded transverse cross sectional view through the slotted portion of an individual quadropole rod and one or more supplemental electrodes in accordance with various embodiments of quadropole apparatuses in accordance with the present teachings.
Figure 7A:
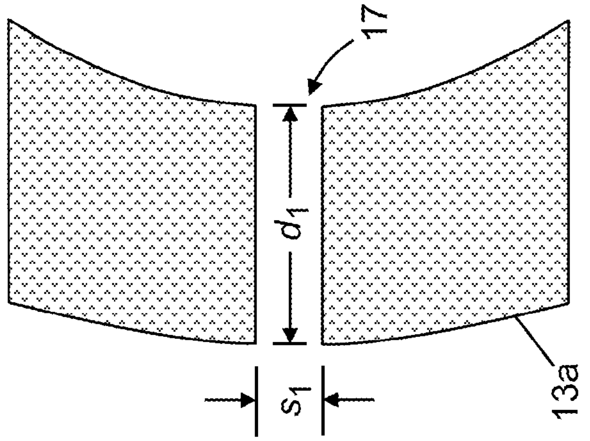
FIG. 7A (Prior Art)
FIG. 7A is an expanded transverse cross sectional view through the slotted portion of an individual quadropole rod of a known linear ion trap mass analyzer apparatus.

FIGS. 7B-7C are expanded transverse cross sectional views through the slotted portions of individual quadropole rod electrodes of alternative embodiments of a quadropole apparatus in accordance with the present teachings. For comparison purposes, FIG. 7A is an expanded transverse cross sectional view through the slotted portion of a conventional rod electrode (cf., FIG. 4). Preferably, a spacer element formed of one or more electrically insulating materials is disposed between each supplemental insert electrode and the central rod electrode within which the supplemental insert electrode is disposed. These spacer elements are shown in FIG. 7B as spacer elements 60 that are disposed between insert electrodes 69 and rod electrode 63*a*. As also shown in FIG. 7C, similar spacer elements 70 are disposed between insert electrodes 79 and rod electrode 73*a*. The supplemental insert electrodes 69 and 79 shown in FIGS. 7B-7C could comprise pairs of electrodes disposed in and adjacent to each slot or, alternatively, could comprise a single, integral electrode member (e.g., as in FIG. 3D and FIG. 3F) disposed in and adjacent to each slot.

It is desirable, in order to prevent contamination and resultant charging, that the spacer elements 60, 70 are not disposed in a position such that they could be encountered by resonantly-ejected ions—that is, in a position in which there exists a direct line of sight into the apparatus ion occupation volume. Accordingly, the insert electrodes (or integral insert electrode members) 69, 79, as shown, are fabricated in the form of an “L” or having a flange portion such that at a portion of the “L” or the flange portion extends into a groove or notch in the enclosing rod electrode. The spacer elements 60, 70 may then be disposed within the groove or notch as shown.

FIGS. 7A-7C illustrate some of the relevant design parameters which were considered during computer simulations of apparatus performance. In the configuration shown in FIG. 7B, the slot, electrically insulating spacer elements 60 and supplemental insert electrodes 69 are configured such that the gap, of width $w_1$, between the parallel plate portions of insert electrode 69 is substantially equal to the width, $s_1$, of the slot 17 in the conventional electrode that it replaces. Also, the effective slot depth, $d_1$, that is defined by parallel plate portions of insert electrodes 69 is substantially equal to the slot depth in the conventional apparatus (FIG. 7A). However, the width, $s_2$, of the slot in the rod electrode 63*a* is necessarily greater than the slot width, $s_1$, of the slot 17 in the conventional electrode 13*a* in order to accommodate the supplemental insert electrode or electrodes 69. The disposition of the supplemental insert electrode(s) 69 within the slot causes the presence of gaps 61 between the supplemental insert electrode(s) 69 and the enclosing rod electrode 63*a*. In typical conventional embodiments, the slot width, $s_1$, is 280 μm. In the example illustrated in FIG. 7B, the width, $w_1$, is also 280 μm, each parallel-plate portion of the insert electrode(s) is and 200 μm thick and the gaps 61 are 100 μm wide. Thus, the slot width, $s_2$, is the sum of these quantities, or 880 μm, as shown.

In the configuration shown in FIG. 7C, the gap width between the parallel plate portions of the insert electrode (or electrodes) 79 is $w_1$ (=280 μm), as in the FIG. 7B example. However, the parallel plate portions of the insert electrode(s) 79 are significantly thicker and the gaps 71 between the insert electrode(s) 79 and the enclosing rod electrode 73*a* are significantly wider than in the apparatus of FIG. 7B. Specifically, the parallel plate portions of the insert electrode(s) 79 are 300 μm thick and the gaps 71 are each 300 μm wide. Thus, the width, $s_3$, of the slot of the rod electrode 73*a* (FIG. 7C) is 1480 μm. The larger dimensions of the apparatus shown in FIG. 7C provide the potential advantages of easier insert-electrode fabrication and reduction of the possibility of electrical arcing. The insert electrode 79 (FIG. 7C) includes a slot depth of $d_1$ which is the same as the other two examples (FIGS. 7A-7B). In addition to the various parameters discussed above, other important parameters are recess depth, r, (see FIG. 6D) and the presence or absence of shield electrode portions (see FIGS. 6B-6C) and the presence or absence of beveled or curved ends 78 of the insert electrodes, these beveled or curved ends serving as approximating extensions of the curved inner surface of the enclosing rod electrode.

Figure 8:
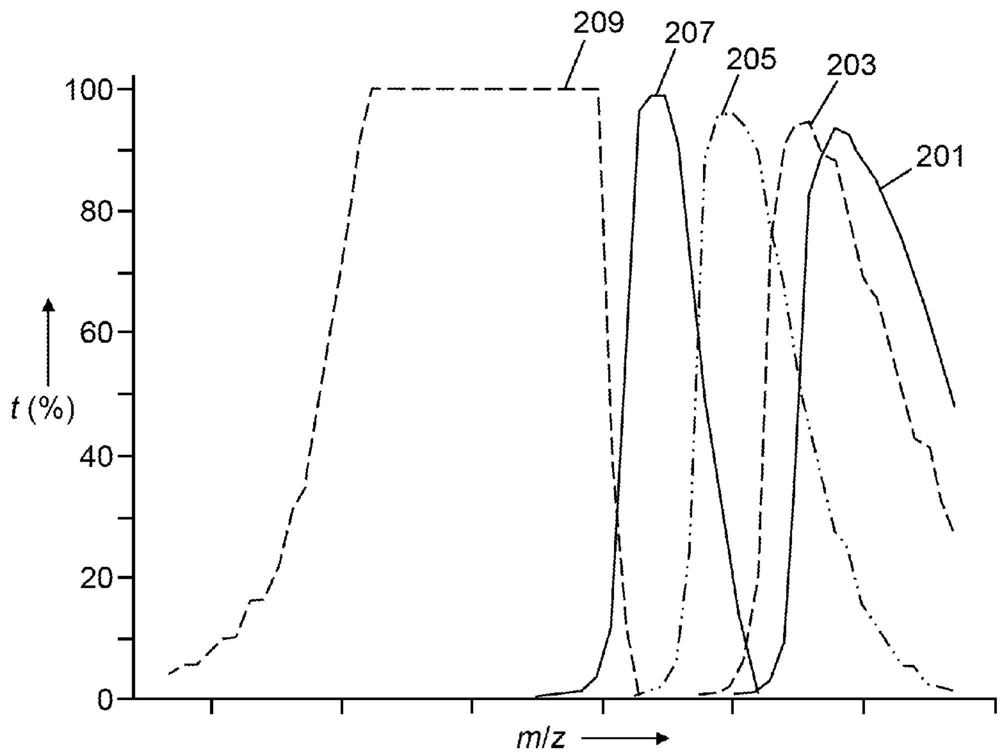
FIG. 8 is a plot of a set of calculated ion transmission curves through a quadrupole apparatus in accordance with the present teachings using the apparatus as a quadrupole mass filter, where the different curves represent different RF overvoltages applied to the insert electrodes.

FIG. 8 is a plot of a set of calculated ion transmission curves through a quadrupole apparatus of the type shown in FIG. 6B-6C, having a shielded, recessed insert electrode (or electrodes). The curves shown in FIG. 8 relate to using the apparatus as a quadrupole mass filter, where the different curves represent different RF over-voltages applied to the insert electrodes, given as percentages of RF overvoltage relative to the rod electrodes. Each of these curves was calculated by modeling, for each ion mass-to-charge ratio, the complete trajectories of 1024 random ions of through the apparatus under the field conditions as calculated for different applied overvoltages. Curve 201 is calculated for zero percent overvoltage; curve 203 is calculated for four percent overvoltage and curve 205 is calculated for twelve percent overvoltage. Similarly, curve 207 is calculated for twenty percent overvoltage and curve 209 is calculated for twenty-eight percent overvoltage. The flat top on curve 209 indicates an extended range of m/z values at which all 1024 ions are transmitted completely through the apparatus. The tick marks along the horizontal axis of the graph in FIG. 8 represent increments of 1 Da. For adequate resolution during the operation of a quadrupole mass filter apparatus, it is desirable for the width of the transmission peak at its half-maximum to be 1 Da or less. Accordingly, curve 207 represents optimal QMF performance under such requirements.

Figure 9A:
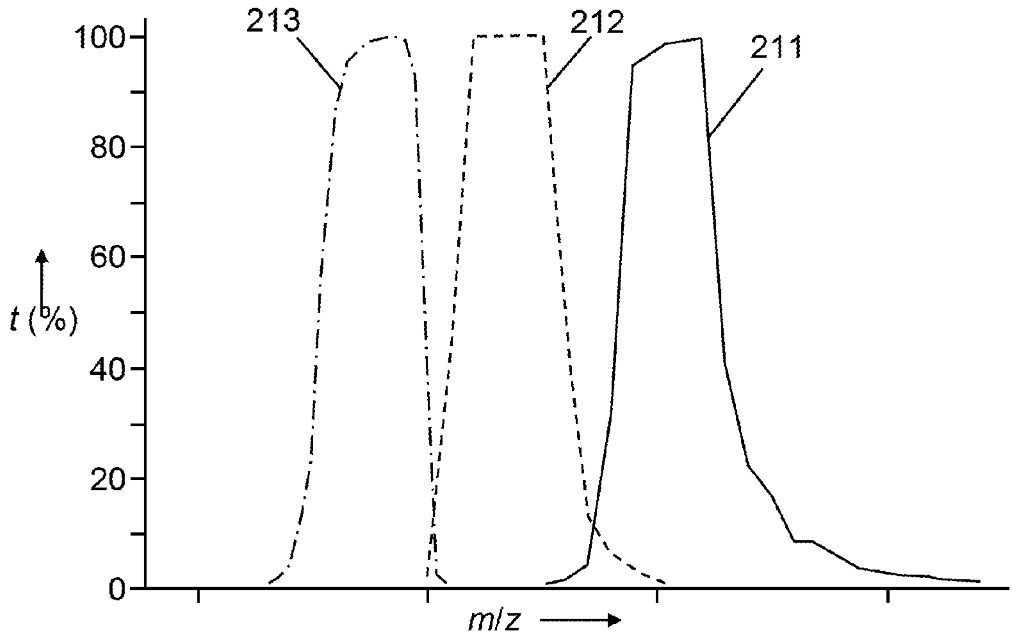
FIGS. 9A-9B show a set of calculated ion transmission curves through various embodiments of quadrupole apparatuses in accordance with the present teachings using the apparatuses as quadrupole mass filters, where each illustrated peak corresponds to the calculated optimum insert over-voltage for the respective embodiment.
Figure 9B:
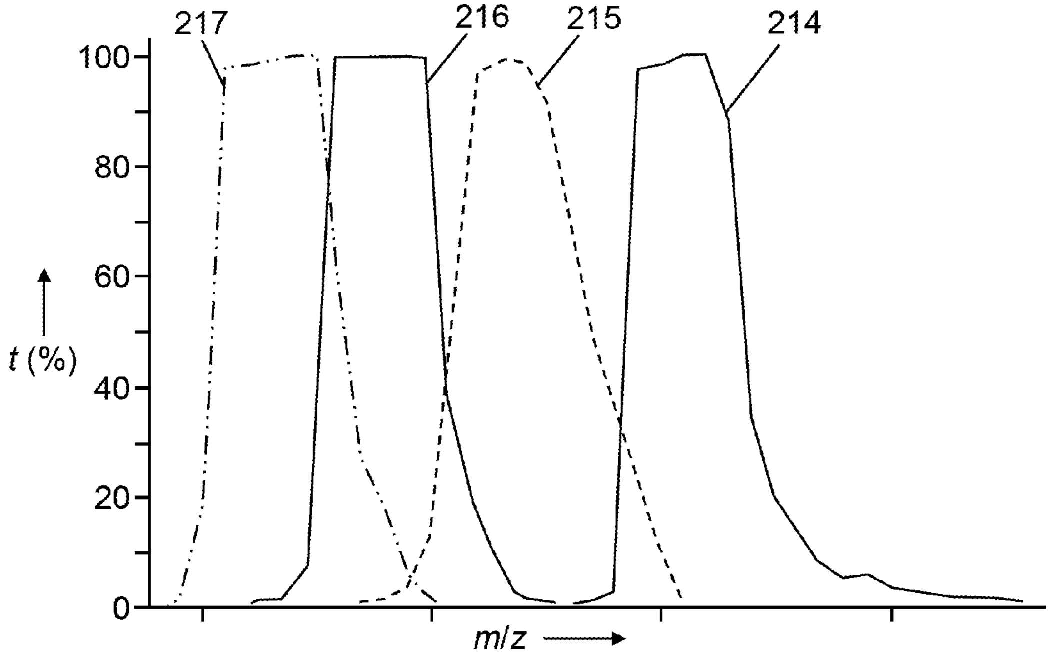

Calculations such as those depicted in FIG. 8 were performed for various alternative embodiments having different electrode configurations. By comparing transmission peaks calculated for various different overvoltages for each configuration, the overvoltage of an optimal QMF transmission curve, as defined above, was identified for each such set of calculations. FIG. 9 depicts a comparison of these various optimal QMF transmission curves. So as to avoid many closely overlapping curves, three such peaks are plotted in FIG. 9A and another four peaks are plotted in FIG. 9B. The scale is the same for both of FIGS. 9A-9B. The tick marks along the horizontal axes of the graphs in FIGS. 9A-9B represent increments of 1 Da. For comparison, curve 213 in FIG. 9A is the calculated result for an ideal quadrupole apparatus having no slots.

Curve 215 in FIG. 9B is the optimal curve for a quadrupole apparatus of the type shown in FIG. 6B-6C using 20% insert-electrode overvoltage on four sets of inserts (one set for each rod electrode) and is the same as curve 207 of FIG. 8. Curve 211 (FIG. 9A) is the optimal peak for an apparatus (similar to that shown in FIG. 7C) having 300 μm insert electrode thickness and 300 μm gaps between the walls of the slot of each enclosing rod electrode and the insert electrode(s) and in which the insert electrode(s) are positioned flush with inner surface of the enclosing rod electrodes and in which 0.9% overvoltage is applied to the insert electrode(s). Curve 217 (FIG. 9B) is the optimal peak for an apparatus that is configured similarly to the apparatus illustrated in FIG. 7B and wherein the applied overvoltage is 1.3%. Curve 212 (FIG. 9A) is the optimal peak for an apparatus that is configured similarly to the apparatus corresponding to curve 211 except that only one rod electrode includes a slot and wherein the applied overvoltage is 0.9%. Curve 214 (FIG. 9B) is the optimal curve for a quadrupole apparatus similar to that associated with curve 211 described above but using a reduced depth, d (see FIG. 7), of 300 μm as opposed to 1000 μm employed in other examples and an overvoltage of 0.9%. Finally, curve 216 (FIG. 9B) is the optimal curve for a configuration in having recessed insert electrodes as in FIG. 6D and using 12.2% insert electrode overvoltage.

The above-described calculated results indicate that the embodiments that include insert electrodes that are recessed within a rod-electrode slot by a significant amount—both with and without a shielding structure on the enclosing rod electrode—require application of an over-voltage to the insert electrodes that is greater than 10 percent of the voltage amplitude that is applied to the rod electrodes. Typically, the rod electrodes receive an RF voltage having an amplitude of approximately 10000 V in normal operation. Therefore, a 10% overvoltage on an insert electrode in a slot can lead to 1000 V potential difference over a gap of only a few hundred microns—a situation that may risk electrical arcing. Thus, such recessed electrode configurations, although possible to implement in some situations, are considered to be less preferable than alternative configurations that employ insert electrodes that are either flush with or only slightly recessed with respect to the rod-electrode inner surface. Configurations that require only a few percent overvoltage on the insert electrodes are preferable.

Figure 10A:
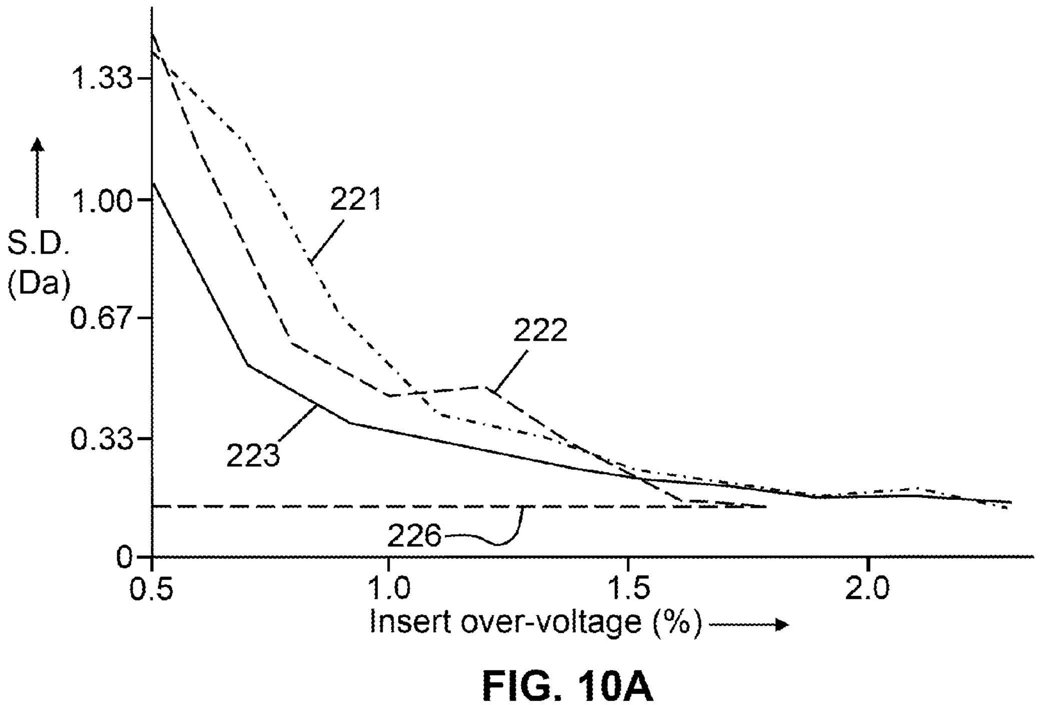
FIGS. 10A-10B are plots of curves showing the variation of calculated peak widths versus insert electrode overvoltage for resonantly ejected ions using various embodiments of quadrupole apparatuses in accordance with the present teachings as linear ion trap mass analyzers.
Figure 10B:
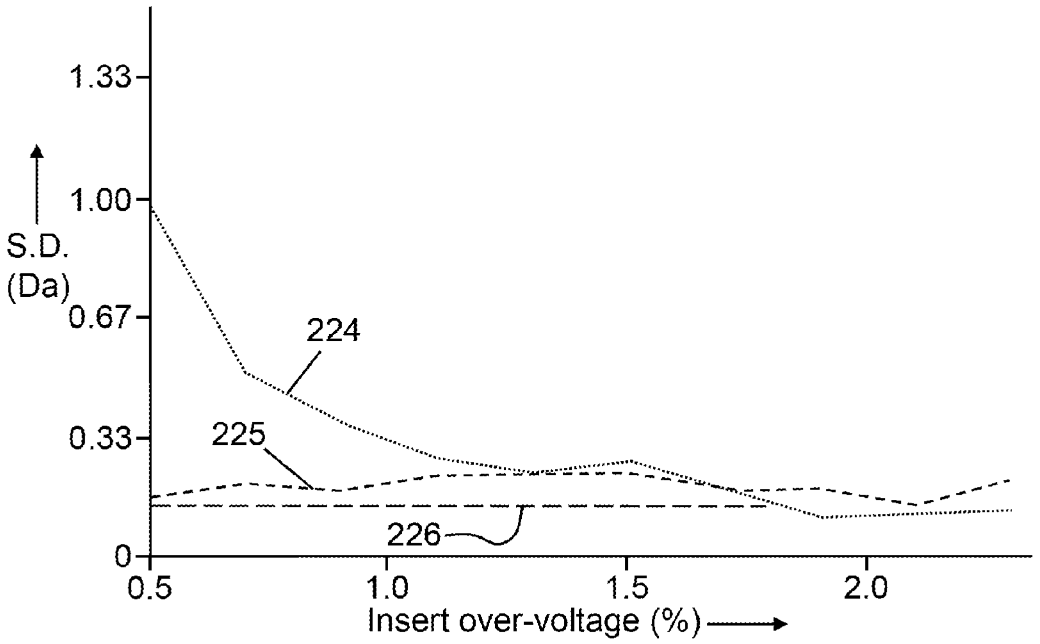
Figure 11:
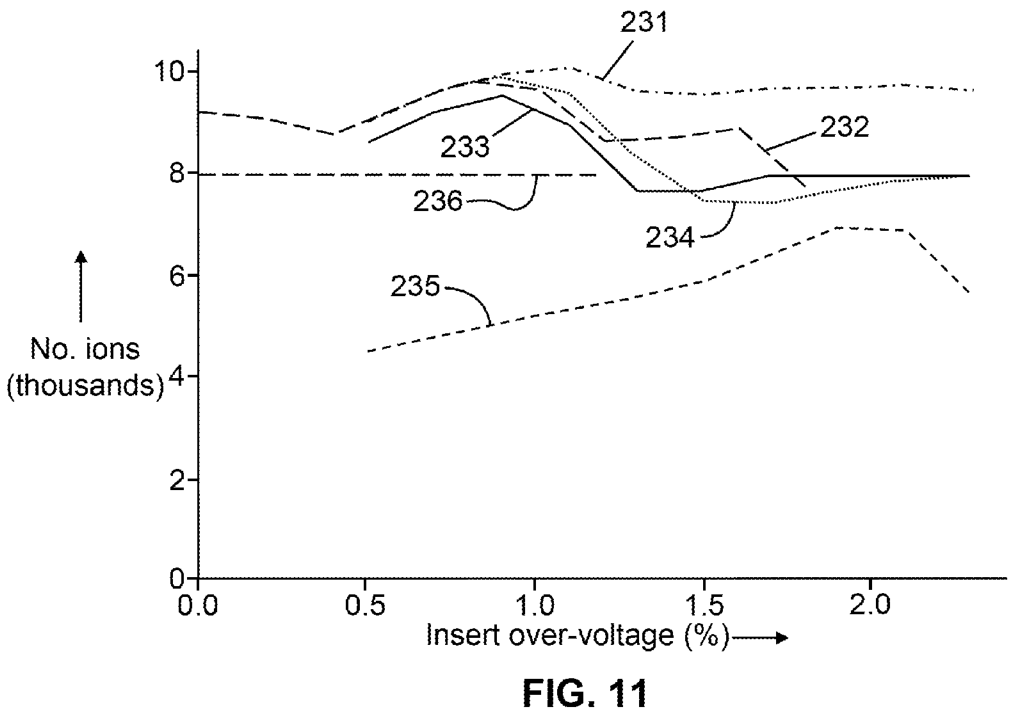
FIG. 11 is a plot of curves showing the variation of calculated peak intensities versus insert electrode overvoltage for resonantly ejected ions using various embodiments of quadrupole apparatuses in accordance with the present teachings as linear ion trap mass analyzers.

FIGS. 10-11 compare the performance of the various alternative apparatus embodiments—but excluding those embodiments having significantly recessed electrodes—in the resonant-ejection linear ion trap mass analysis mode of operation. The graphs shown in FIGS. 10-11 pertain to the use of an optimized value for applied resonant excitation energy for each configuration. FIG. 10 is a set of curves showing the variation of calculated peak width—given as standard deviation (S.D.) in units of Daltons (Da)—for each respective configuration plotted against the applied insert electrode overvoltage, all relating to the use of the optimal resonant excitation energy. FIG. 11 is a set of curves showing the variation of calculated peak intensity for each respective configuration plotted against insert-electrode overvoltage. So as to avoid many closely overlapping curves in FIG. 10, three curves (curves 221-223) are plotted in FIG. 10A and another two curves (curves 224-225) are plotted in FIG. 10B. The horizontal dashed line 226 in both of FIGS. 10A-10B represents the peak width of a conventional linear ion trap mass analyzer and is provided for comparison purposes.

Curve 221 in FIG. 10A and curve 231 in FIG. 11, both depicted by dash-dot lines, represent calculated peak width and intensity results for a configuration utilizing a 300 μm insert electrode thickness and gap width between the insert electrodes and the respective enclosing slots (see FIG. 7C) and in which the slot depth, d, is 300 μm and using 2.8 V resonance-ejection energy. Curve 222 in FIG. 10A and curve 232 in FIG. 11, both depicted by lines with long dashes, represent calculated peak width and intensity results for a configuration similar to that illustrated in FIG. 7B and 2.1 V resonance-ejection energy. Curve 223 in FIG. 10A and curve 233 in FIG. 11, both depicted by solid lines, represent calculated peak width and intensity results for a configuration similar to that corresponding to curves 221 and 231 (300 μm insert electrode thickness and gap width) and additionally employing a grounded box enclosing the apparatus. Curve 224 in FIG. 10B and curve 234 in FIG. 11, both depicted by dotted lines, represent calculated peak width and intensity results for a configuration utilizing a 300 μm insert electrode thickness and gap width between the insert electrodes and enclosing slots (see FIG. 7C), a 1000 μm slot depth, d, and using 2.8 V resonance-ejection energy. Finally, curve 225 in FIG. 10B and curve 235 in FIG. 11, both depicted by lines with short dashes, represent calculated peak width and intensity results for a configuration utilizing a single insert electrode member (i.e., only one slotted rod) having a 300 μm insert electrode thickness and gap width and using 2.8 V resonance-ejection energy and, additionally, a grounded box enclosing the apparatus. For comparison purposes, curve 226 in FIGS. 10A-10B and curve 236 in FIG. 11 represent the calculated peak width and intensity results for a conventional apparatus comprising for slotted rod electrodes and no insert electrodes in which the slot widths are 280 μm.

Some conclusions may be drawn from the calculated performance of a dual-use quadrupole apparatus that includes supplemental insert electrodes, as depicted in FIGS. 8-11. In a broad sense, the results are quite favorable when compared to an ideal quadrupole mass filter configuration and to currently commercially-available linear ion trap configurations. Quite clearly, the incorporation of supplemental insert electrodes into the slots of the rod electrodes of a linear ion trap mass analyzer can enable the same apparatus to be utilized as a quadrupole mass filter having peak resolution and peak intensity characteristics (e.g., FIG. 8) that are nearly as good as those of a pure quadrupole mass filter. Except for configurations in which the insert electrodes are significantly recessed within the slots, this favorable performance as a quadrupole mass filter can be obtained with as little as 0.9% RF over-voltage applied to the insert electrodes. Further, except for the recessed-electrode configurations, the peak intensity that may be obtained in linear-ion-trap mass analyzer mode is not significantly degraded. However, to obtain good peak resolution when operating the apparatus in linear-ion-trap mass analyzer mode, it may be necessary to apply an RF over-voltage to the insert electrodes of as much as 1.5%.

Since the over-voltage required for optimal results may differ between the QMF and LIT modes, depending on the particular configuration employed, it may be necessary to change this over-voltage depending on the operating mode. Separate calibrations of over-voltage and other operating parameters may therefore be required for the two modes of operation.

Figure 12A:
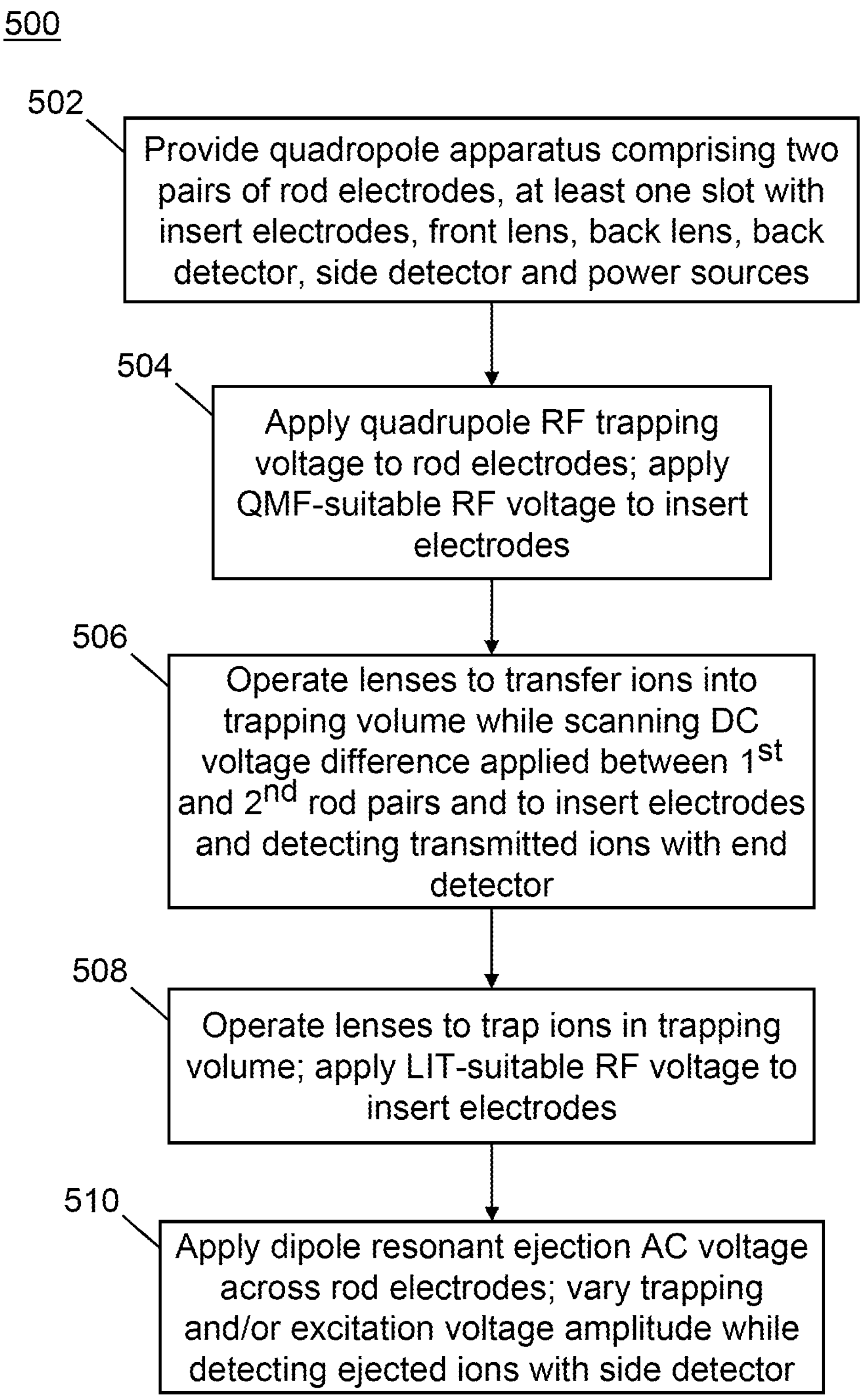
FIG. 12A is a flow diagram of a first method for operating a quadrupole apparatus in accordance with the present teachings.

In view of the above discussion and considerations FIG. 12A is a flowchart of a first method, method 500, of operating a quadrupole apparatus in accordance with the present teachings. The first step, 502, of the method 500 comprises the providing of a quadropole apparatus comprising: four substantially parallel rod electrodes defining an ion occupation region therebetween, at least one of the electrodes having a slot; at least one supplemental insert electrode disposed within a slot; a front ion lens disposed at an entrance end of the quadrupole apparatus; a back ion lens disposed at an exit end of the quadrupole axis; at least one detector (a "back" detector) disposed so as to receive and detect ions that pass through the exit end and the back detector; a side detector disposed so as to receive ions that pass out of the ion occupation region through the slot and power sources electrically coupled to the rod electrodes the supplemental insert electrode and the front and back lenses. As described elsewhere in this document, the four electrodes comprise two pairs of electrodes, the two electrodes of each pair being diametrically opposed in regard to the ion occupation region and being electrically coupled to one another such that both electrodes of a pair are at the same electrical potential. Preferably, the inward-facing surface of each rod electrode that bounds the ion occupation region comprises a hyperbolic shape.

The power sources provided in step 502 comprise an RF power source for providing an RF voltage to at least one pair of the rod electrodes, such that the RF phase of a first pair of rod electrodes is exactly out of phase with regard to the RF phase of the other pair of rods. The at least on supplemental insert electrode is also electrically coupled to either the same or a different RF power source, such that, in operation, the RF phase of each supplemental insert electrode is the same as the RF phase of the rod electrode in which the insert electrode is disposed, wherein the RF amplitude applied to the supplemental insert electrode is greater than the RF amplitude of the enclosing rod electrode. The power sources also include at least one DC voltage power supply for applying a variable DC filtering voltage between the pairs of rod electrodes and for applying axial ion trapping voltages between the rod electrodes and the front and back lenses. The power sources also include an excitation voltage source for applying an ion excitation voltage comprising a dipole AC voltage across the rods of one pair of rods.

In step 504 of the method 500, a quadrupole RF voltage is applied to the rod electrodes of the quadrupole apparatus while an RF voltage that is suitable for quadrupole mass filter (QMF) operation is applied to the at least one supplemental insert electrode. If the aforementioned four rod electrodes are central electrodes between front-end and back-end electrodes (as in FIG. 3A), then the same or lower RF voltages may be applied similarly to the front-end and back-end electrodes. A QMF-suitable RF voltage operation is one in which the RF phase of each insert electrode is exactly in-phase with the phase of the respective enclosing rod electrode and in which the RF amplitude of the insert electrode is greater than the RF amplitude applied to the enclosing electrode. The amount by which the RF amplitude of the insert electrode is greater than the RF amplitude of the rod electrode (i.e., the insert electrode over-voltage) will generally be determined by prior characterizations of the variation of transmitted-ion peak shape and peak intensity with the percentage of over-voltage. To avoid potential arcing problems, the overvoltage should be less than about 10% of the rod voltage amplitude.

In the subsequent step 506 of the method 500, RF voltages applied to the rod electrodes and insert electrodes (step 504) are maintained while appropriate DC potentials are applied to the front and back lenses (and, if applicable, the front-end and back-end rod electrodes) so as to urge ions into the ion occupation volume and to enable transfer of some ions from the entrance end to the exit end of the quadrupole apparatus. The ions may be provided directly from an ion source or, alternatively, may comprise ions that have been produced from the original ion source ions by subsequent manipulation—such as by ion-ion reaction or fragmentation and subsequent isolation. While the ions pass into and through the ion occupation volume, a temporally varying filtering DC potential difference is applied between the first and second rod pairs and to the insert electrodes such that the m/z ratio of ions that are allowed to be transmitted through the apparatus is caused to vary in a controlled fashion. The transmitted ions are detected by the end detector, thus effecting a mass-sequential analytical scan.

In step 508 of the method 500, the quadrupole apparatus is set up for operation as a linear ion trap (LIT) mass analyzer that performs analyses by detection of ions that are resonantly ejected radially—that is, through the one or more slots. Accordingly, in step 508, the front and back ion lenses are operated so as to axially trap ions in the ion occupation volume between the four rods by applying appropriate DC potential differences between the rod electrodes and the front and back ion lenses. If the four rod electrodes are central electrodes between front-end and back-end electrodes (as in FIG. 3A), appropriate DC voltages are also applied between the central electrodes and each of the front-end and back-end electrodes. The ions may be provided directly from an ion source or, alternatively, may comprise ions that have been produced from the original ion source ions by subsequent manipulation—such as by ion-ion reaction or fragmentation and subsequent isolation. Also, while maintaining the RF voltages applied to the rod electrodes, the insert-electrode over-voltage is adjusted so as to be suitable for LIT operation. The appropriate insert electrode over-voltage will generally be determined by prior characterizations of the variation of ejected-ion peak shape and peak intensity with the percentage of over-voltage. Occasionally, it may be adequate to employ the same insert-electrode over-voltage as used during the prior QMF operation. In general, however, the optimal over-voltage for LIT resonance ejection operation will differ from the optimal over-voltage corresponding to QMF operation. To avoid potential arcing problems, the overvoltage should be less than about 10% of the rod voltage amplitude.

In step 510, a variable dipole resonant ejection AC voltage is applied across rod electrodes of one pair of diametrically opposed electrodes (i.e., across the pair of electrodes having the one or more slots that are adjacent to a side detector). The amplitude of the RF voltage or of the AC excitation voltage (or both) is then caused to temporally vary in known fashion such that the m/z of ejected ions is caused to vary in a controlled fashion. The ejected ions are detected with the side detector (or detectors) as they are ejected, thus effecting a mass-sequential analytical scan.

Figure 12B:
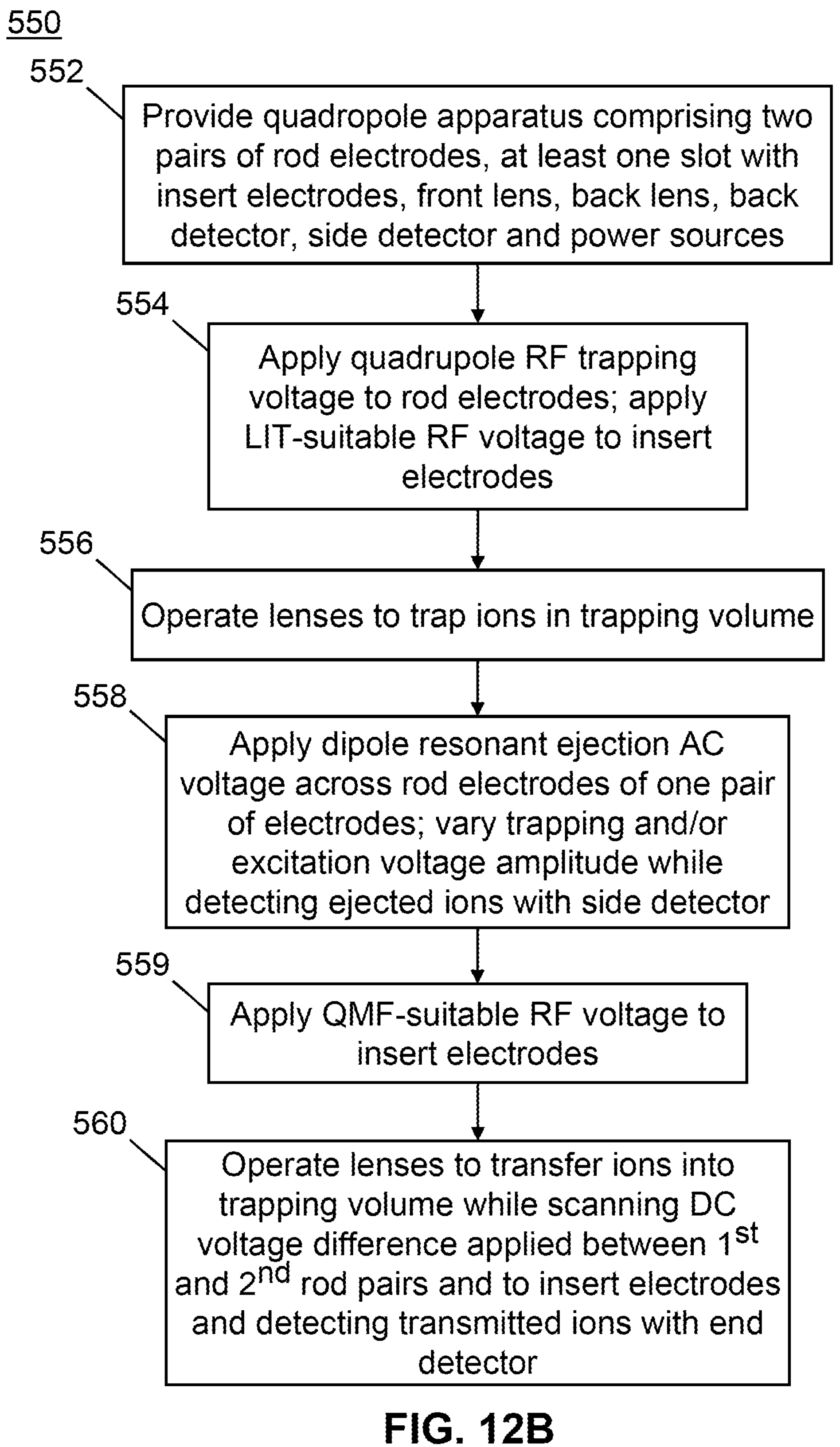
FIG. 12B is a flow diagram of a second method for operating a quadrupole apparatus in accordance with the present teachings.

The method 500 described above comprises a first stage of QMF operation followed by a subsequent stage of LIT operation. However, the order of these operations may be reversed. Accordingly, FIG. 12B is a flowchart of a second method, method 550, of operating a quadrupole apparatus in accordance with the present teachings. The method 550 comprises a first stage of LIT operation followed by a subsequent stage of LIT operation. Thus, the discussions above in regard to method 500 are mostly applicable to method 550 also, but with the sequence of some operations altered.

The discussion included in this application is intended to serve as a basic description. Although the present invention has been described in accordance with the various embodiments shown and described, one of ordinary skill in the art will readily recognize that there could be variations to the embodiments or combinations of features in the various illustrated embodiments and those variations or combinations of features would be within the spirit and scope of the present invention. The reader should thus be aware that the specific discussion may not explicitly describe all embodiments possible; many alternatives are implicit. Accordingly, many modifications may be made by one of ordinary skill in the art without departing from the scope and essence of the invention. Neither the description nor the terminology is intended to limit the scope of the invention—the invention is defined only by the claims. Any patents, patent applications or other publications mentioned herein are hereby explicitly incorporated herein by reference in their respective entirety.

What is claimed is:

1. An apparatus comprising:

a set of four substantially parallel rod electrodes having an ion occupation volume therebetween having an entrance end and an exit end, at least one of the rod electrodes having a slot passing therethrough;

first and second ion optics disposed adjacent to the entrance and exit ends, respectively;

a voltage supply system; and at least one supplemental electrode disposed at least partially within the at least one slot, wherein the voltage supply system is configured so as to supply a radio-frequency (RF) voltage, a direct-current (DC) filtering voltage and an oscillatory dipole resonant ejection voltage across members of the set of rod electrodes and so as to supply a secondary RF voltage and a secondary DC filtering voltage to the at least one supplemental electrode and to supply DC voltages across the rod electrodes and each of the first and second ion optics.

2. An apparatus as recited in claim 1, wherein each supplemental electrode is recessed within the slot within which it is disposed with respect to an end of the said slot that faces the ion occupation volume.

3. An apparatus as recited in claim 2, wherein a direct line of sight between each recessed supplemental electrode and the ion occupation volume is blocked by a shield portion of a rod electrode.

4. An apparatus as recited in claim 1, wherein the voltage supply system is configured such that an amplitude of the secondary RF voltage exceeds an amplitude of the radio-frequency voltage by a pre-determined or calibrated percentage.

5. An apparatus as recited in claim 4, wherein the secondary DC filtering voltage exceeds the DC filtering voltage, when said DC filtering voltage is applied, by the pre-determined or calibrated percentage.

6. An apparatus as recited in claim 1, wherein each of the rod electrodes has a respective slot passing therethrough.

7. An apparatus as recited in claim 6, wherein the at least one supplemental electrode comprises two spaced-apart supplemental electrodes within each slot, each of the two supplemental electrodes comprising a respective plate disposed parallel to internal walls of the slot.

8. An apparatus as recited in claim 6, wherein the at least one supplemental electrode comprises a respective single, integral supplemental electrode at least partially disposed within each slot and having an aperture passing therethrough.

9. An apparatus as recited in claim 1, wherein exactly two of the rod electrodes have respective slots passing therethrough.

10. An apparatus as recited in claim 1, wherein only a single one of the rod electrodes has a slot passing therethrough.

11. An apparatus as recited in claim 10, wherein the at least one supplemental electrode comprises two spaced-apart supplemental electrodes within the slot, each of the two supplemental electrodes comprising a respective plate disposed parallel to internal walls of the slot.

12. An apparatus as recited in claim 10, wherein the at least one supplemental electrode comprises a respective single, integral supplemental electrode at least partially disposed within the slot and having an aperture passing therethrough.

13. An apparatus as recited in claim 1, wherein the voltage supply system is configured to supply the oscillatory dipole resonant ejection voltage across first and second supplemental electrodes that are disposed in diametric opposition to one another with respect to the ion occupation volume.

14. A method of operating a quadrupole apparatus comprising: (a) four substantially parallel rod electrodes having an ion occupation volume therebetween and having an entrance end and an exit end, wherein a rod electrode has a slot passing therethrough; (b) at least one supplemental electrode disposed within the slot; (c) a first detector disposed to receive ions that pass out of the ion occupation volume from the exit end; and (d) a second detector disposed to receive ions that pass out of the ion occupation volume through the slot, the method comprising:

(i) applying an RF voltage to the rod electrodes such that the voltage waveform applied to a first pair of rod electrodes that are diametrically opposed to one another with respect to the ion occupation volume is 180-degrees out of phase with the voltage waveform applied to the other pair of rod electrodes;

(ii) applying a secondary RF voltage to the at least one supplemental electrode such that the voltage waveform applied to each supplemental electrode is in-phase with and of a greater amplitude than the voltage waveform applied to the respective rod electrode having the slot within which said each supplemental electrode is disposed;

(iii) supplying a sample of ions into the input end of the ion occupation volume while applying the RF voltage to the first pair of rod electrodes, the secondary RF voltage to the at least one supplemental electrode and a temporally varying DC voltage between the first and the other pairs of electrodes such that the mass to charge ratios of ions that pass through the ion occupation volume, through the exit end and to the first detector is controllably varied; and (iv) detecting the ions that arrive at the first detector so as to generate a mass spectrum of the sample of ions, wherein the greater amplitude of the secondary RF voltage applied to each supplemental electrode is chosen so as to optimize peak characteristics of the mass spectrum.

15. A method as recited in claim 14, further comprising:

(v) supplying a second sample of ions into the input end of the ion occupation volume while applying the RF voltage to the rod electrodes and the secondary RF voltage to the at least one supplemental electrode;

(vi) applying voltages to ion optical elements disposed adjacent to the entrance and exit ends and to the four rod electrodes so as to trap the second sample of ions within the ion occupation volume;

(vii) applying a dipole AC excitation voltage between the rod electrode having the slot and the rod electrode that is diametrically opposed to the slotted rod electrode with respect to the ion occupation volume;

(viii) temporally varying either the applied RF voltage amplitude or the AC excitation voltage amplitude while applying the secondary RF voltage having a different amplitude from that applied in step (ii) to the at least one supplemental electrode such that the mass to charge ratios of ions that are ejected through the slot and to the second detector is controllably varied; and (ix) detecting the ions that arrive at the second detector so as to generate a mass spectrum of the second sample of ions.

* * * * *